US010764781B2

(12) United States Patent
Mitra et al.

(10) Patent No.: US 10,764,781 B2
(45) Date of Patent: Sep. 1, 2020

(54) SYSTEMS AND METHODS FOR REORDERING DATA RECEIVED FROM A PLURALITY OF RADIO ACCESS TECHNOLOGIES (RATS)

(71) Applicant: QUALCOMM Incorporated, San Diego, CA (US)

(72) Inventors: Alok Mitra, San Diego, CA (US); Vaibhav Kumar, Encinitas, CA (US); Shailesh Maheshwari, San Diego, CA (US); Uppinder Babbar, San Diego, CA (US); Gang Xiao, San Diego, CA (US); Vanitha Kumar, San Diego, CA (US); Srinivas Reddy Mudireddy, San Diego, CA (US); Arunn Krishnamurthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 15/495,482

(22) Filed: Apr. 24, 2017

(65) Prior Publication Data
US 2017/0325124 A1   Nov. 9, 2017

Related U.S. Application Data

(60) Provisional application No. 62/331,337, filed on May 3, 2016, provisional application No. 62/331,340, filed on May 3, 2016.

(51) Int. Cl.
*H04W 28/06* (2009.01)
*H04L 12/801* (2013.01)
(Continued)

(52) U.S. Cl.
CPC ............. *H04W 28/06* (2013.01); *H04L 47/34* (2013.01); *H04W 28/10* (2013.01); *H04L 47/125* (2013.01); *H04L 49/9057* (2013.01)

(58) Field of Classification Search
CPC ........ H04W 28/06; H04W 8/10; H04L 47/34; H04L 47/125; H04L 49/9057
See application file for complete search history.

(56) References Cited

U.S. PATENT DOCUMENTS 7,957,389 B2 * 6/2011 Hu .................. H04L 1/1848
370/394
9,265,055 B2   2/2016 Okuda
(Continued)

FOREIGN PATENT DOCUMENTS

WO    2015065914 A1    5/2015

OTHER PUBLICATIONS

International Search Report and Written Opinion—PCT/US2017/029411—ISA/EPO—dated Aug. 25, 2017.
(Continued)

*Primary Examiner* — Christopher M Crutchfield
*Assistant Examiner* — Tito Q Pham
(74) *Attorney, Agent, or Firm* — Austin Rapp

(57) ABSTRACT

A method for reordering data by an electronic device is described, including receiving a first set of data packets via a first radio access technology (RAT). The method also includes receiving a second set of data packets via a second RAT. The first and second sets of data packets are from a data stream. The method further includes providing at least a portion of the first set of data packets or of the second set of data packets to an application processor. The method additionally includes buffering, in application processor memory, the at least the portion of the first set of data packets or the at least the portion of the second set of data
(Continued)

packets. The method also includes reordering the at least the portion of the first set of data packets or the at least the portion of the second set of data packets.

19 Claims, 28 Drawing Sheets

(51) Int. Cl.
*H04W 28/10* (2009.01)
*H04L 12/803* (2013.01)
*H04L 12/861* (2013.01)

(56) References Cited

U.S. PATENT DOCUMENTS

| | | | |
|---|---|---|---|
| 9,369,398 B2 | 6/2016 | Chan et al. | |
| 9,585,048 B2* | 2/2017 | Ozturk | H04W 28/0205 |
| 2007/0058669 A1* | 3/2007 | Hoffmann | H04L 47/125 |
| | | | 370/466 |
| 2007/0206600 A1 | 9/2007 | Klimker et al. | |
| 2010/0033869 A1* | 2/2010 | Oishi | G11B 5/584 |
| | | | 360/78.02 |
| 2010/0130208 A1* | 5/2010 | Hayashi | H04W 36/02 |
| | | | 455/436 |
| 2012/0311180 A1* | 12/2012 | Barkey | G06F 13/385 |
| | | | 709/238 |
| 2013/0308690 A1* | 11/2013 | Kalla | H04W 52/0216 |
| | | | 375/222 |
| 2014/0207991 A1* | 7/2014 | Kaushik | G06F 13/4269 |
| | | | 710/308 |
| 2015/0117357 A1* | 4/2015 | Ozturk | H04W 28/0205 |
| | | | 370/329 |
| 2016/0234752 A1 | 8/2016 | Hsu et al. | |
| 2016/0338068 A1 | 11/2016 | Cheng et al. | |
| 2016/0338074 A1 | 11/2016 | Chou et al. | |
| 2016/0366613 A1* | 12/2016 | Zhu | H04W 28/08 |

OTHER PUBLICATIONS

Wireless World Research Forum et al., "LTE Small Cell Enhancement by Dual Connectivity," Nov. 15, 2014 (Nov. 15, 2014), pp. 1-22, XP055301402, Retrieved from the Internet: URL:http://www.wwrf.ch/files/wwrf/content/ files/publications/outlook/Outlook15.pdf [retrieved on Sep. 9, 2016].

* cited by examiner

SYSTEMS AND METHODS FOR REORDERING DATA RECEIVED FROM A PLURALITY OF RADIO ACCESS TECHNOLOGIES (RATS)

RELATED APPLICATIONS

This application is related to and claims priority to U.S. Provisional Patent Application Ser. No. 62/331,337 filed May 3, 2016, for "TECHNIQUES FOR REORDERING DATA RECEIVED FROM A PLURALITY OF RADIO ACCESS TECHNOLOGIES (RATs)," and to U.S. Provisional Patent Application Ser. No. 62/331,340, filed May 3, 2016, for "TECHNIQUES FOR REORDERING DATA RECEIVED FROM A PLURALITY OF RADIO ACCESS TECHNOLOGIES (RATs)."

FIELD OF DISCLOSURE

The present disclosure relates generally to electronic devices. More specifically, the present disclosure relates to systems and methods for reordering data received from a plurality of radio access technologies (RATs).

BACKGROUND

Computing devices are common within modern society. Ranging from small mobile computing devices, such as a smart phone or tablet, to large server farms with numerous blades and memory banks, these devices are expected to communicate across myriad networks while providing various other base functions.

Improvements in network communications have increased data rates. For example, copper wires have been replaced with higher bandwidth fiber optic cables, and cellular networks have evolved with protocols capable of supporting higher data rates. As the data rates have increased, the need to be able to process these increased data rates within computing devices has also increased.

As can be observed from the foregoing discussion, increasing data rates and/or data loads may cause difficulties in handling the increased data rates and/or data loads. Accordingly, systems and methods that improve capacity for handling data may be beneficial.

SUMMARY

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

A method for reordering data by an electronic device is described. The method includes receiving, by a modem processor, a first set of data packets via a first radio access technology (RAT). The method also includes receiving, by the modem processor, a second set of data packets via a second radio access technology (RAT). The first set of data packets and the second set of data packets are from a data stream. The method further includes providing, by the modem processor, at least a portion of the first set of data packets or at least a portion of the second set of data packets to an application processor. The method additionally includes buffering, in application processor memory, the at least the portion of the first set of data packets or the at least the portion of the second set of data packets. The method also includes reordering the at least the portion of the first set of data packets or the at least the portion of the second set of data packets.

Reordering the at least the portion of the first set of data packets or the at least the portion of the second set of data packets may include determining, by the modem processor, a first reordering information or a second reordering information based on sequence numbering of the portion of the first set of data packets or of the portion of the second set of data packets. Reordering the at least the portion of the first set of data packets or the at least the portion of the second set of data packets may also include providing, by the modem processor, the first reordering information for the at least the portion of the first set of data packets or the second reordering information for the at least the portion of the second set of data packets to the application processor.

The first reordering information or the second reordering information may include one or more completion events. Providing the first reordering information or the second reordering information may include sending, by the modem processor, the first reordering information or the second reordering information in an order for packet consumption by the application processor.

Determining the first reordering information or the second reordering information may include reordering an out of order event ring based on the sequence numbering. The at least the portion of the first set of data packets may be a first aggregated set of packets in contiguous order or the at least the portion of the second set of data packets may be a second aggregated set of packets in contiguous order. The method may include determining the first reordering information or the second reordering information by determining a first sequence number and a last sequence number for the first aggregated set of packets or for the second aggregated set of packets.

The at least the portion of the first set of data packets or the at least the portion of the second set of data packets may be provided to an application processor for storage in a single frame regardless of whether the at least the portion of the first set of data packets or the at least the portion of the second set of data packets are in contiguous order. The method may also include determining the first reordering information or the second reordering information by determining a length, an offset, and an end indicator for at least a contiguous portion of a first aggregated set of packets or for at least a contiguous portion of a second aggregated set of packets.

The method may include providing, by the modem processor, a first reordering information for the at least the portion of the first set of data packets or a second reordering information for the at least the portion of the second set of data packets to the application processor. The first reordering information or the second reordering information may include a sequence indicator for each of the data packets of the at least the portion of the first set of data packets or the at least the portion of the second set of data packets, a bearer indicator for each of the data packets of the at least the portion of the first set of data packets or the at least the portion of the second set of data packets, and a link indicator for each of the data packets of the at least the portion of the first set of data packets or the at least the portion of the second set of data packets.

The method may include detecting, by the modem processor, a flushing condition. The method may also include providing, by the modem processor, a flush command to the application processor. The method may include controlling, by the modem processor, reordering logic in the application processor in order to perform one or more of stopping, starting, and flushing out of order buffers in the application processor memory.

An electronic device is also described. The electronic device includes a modem processor configured to receive a first set of data packets via a first radio access technology (RAT), and to receive a second set of data packets via a second radio access technology (RAT). The first set of data packets and the second set of data packets are from a data stream. The modem processor is also configured to provide at least a portion of the first set of data packets or at least a portion of the second set of data packets to an application processor. The electronic device also includes application processor memory configured to buffer the at least the portion of the first set of data packets or the at least the portion of the second set of data packets. The electronic device is configured to reorder the at least the portion of the first set of data packets or the at least the portion of the second set of data packets.

A non-transitory tangible computer-readable medium storing computer executable code is also described. The computer-readable medium includes code for causing an electronic device to receive, by a modem processor, a first set of data packets via a first radio access technology (RAT). The computer-readable medium also includes code for causing the electronic device to receive, by the modem processor, a second set of data packets via a second radio access technology (RAT). The first set of data packets and the second set of data packets are from a data stream. The computer-readable medium further includes code for causing the electronic device to provide, by the modem processor, at least a portion of the first set of data packets or at least a portion of the second set of data packets to an application processor. The computer-readable medium additionally includes code for causing the electronic device to buffer, in application processor memory, the at least the portion of the first set of data packets or the at least the portion of the second set of data packets. The computer-readable medium also includes code for causing the electronic device to reorder the at least the portion of the first set of data packets or the at least the portion of the second set of data packets.

An apparatus is also described. The apparatus includes modem processing means for receiving a first set of data packets via a first radio access technology (RAT), and for receiving a second set of data packets via a second radio access technology (RAT). The first set of data packets and the second set of data packets are from a data stream. The apparatus also includes modem processing means for providing at least a portion of the first set of data packets or at least a portion of the second set of data packets to an application processing means. The apparatus further includes application processing memory means for buffering the at least the portion of the first set of data packets or the at least the portion of the second set of data packets. The apparatus further comprises means for reordering the at least the portion of the first set of data packets or the at least the portion of the second set of data packets.

DETAILED DESCRIPTION

Figure 1A:
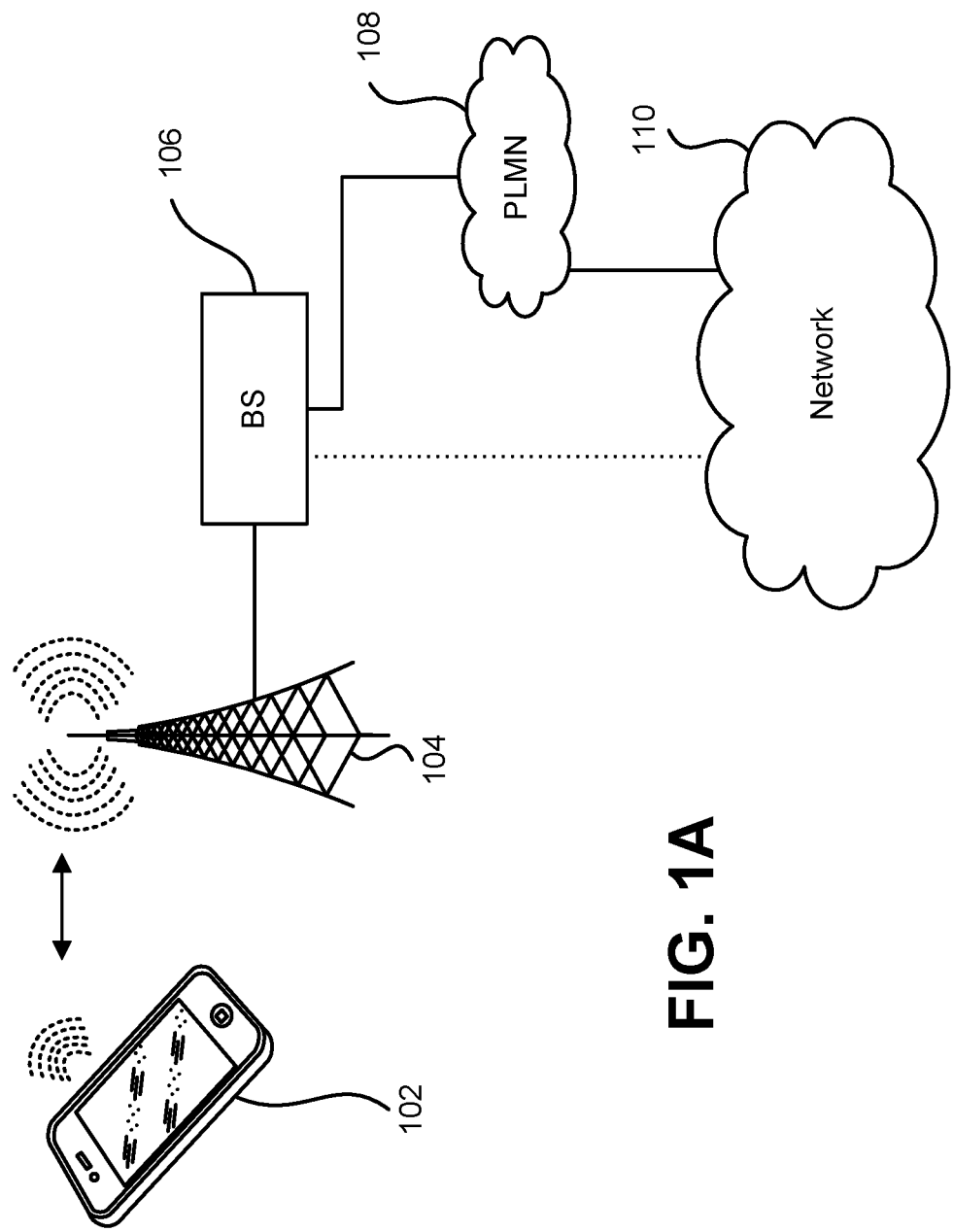
FIG. 1A is a diagram illustrating one example of an electronic device in which systems and methods for reordering data may be implemented.

The systems and methods disclosed herein relate to data reordering. For example, some configurations of the systems and methods disclosed herein may relate to device-based layer 2 (L2) reordering using application processor (e.g., host) memory (e.g., buffers). Some configurations of the systems and methods disclosed herein may relate to application processor-assisted (e.g., host-assisted) layer 2 (L2) reordering.

As used herein, the terms "layer 2" and "L2" may relate to a layer of protocols of a wide area network (WAN) radio stack that is involved in data transmission and/or reception. For example, layer 2 of the WAN radio stack may include a radio link control (RLC) protocol and a packet data convergence protocol (PDCP).

The RLC protocol may include functions such as reordering packet data, segmentation of data, and/or reassembly of data, etc. The PDCP may include functions such as transferring data to upper layers, integrity protection, ciphering data, and/or deciphering data, etc. RLC protocol and/or PDCP may be required to transmit packets in order to an application processor (e.g., host). More specifically, while handling long term evolution (LTE) downlink (DL) traffic, the modem processor may be expected to perform reordering at either the radio link control (RLC) or packet data convergence protocol (PDCP) layers before sending data to upper layers and eventually to the application processor or to a tethered endpoint. Reordering may require the device (e.g., user equipment (UE)) to store out of order received packets until the in order sequence is determined.

One current problem in the field of wireless communications is that for wide area network (WAN) transfers, a device (e.g., UE) may be required to reorder buffers before transmitting data to an application processor (e.g., host). In peak Long Term Evolution (LTE) and LTE-Wi-Fi Link Aggregation (LWA) or dual carrier-LTE (DC-LTE) cases, for example, this puts an immense burden on available UE modem memory and might result in delivering out of order (OOO) data to the application processor in a case where memory runs out or might even result in dropping bearers or a call reactively to maintain device stability. Some configurations of the systems and methods disclosed herein may reduce complexity of a modem device and/or may help reduce the cost of the modem device in comparison with other approaches.

During peak LTE throughput scenarios, the memory requirement for reordering buffers may increase significantly against available electronic device (e.g., UE) modem memory. This may cause modems with low memory configurations to reduce time to reordering buffers from a recommended value to time in which available memory would get filled up. Or, in some cases, the electronic device (e.g., modem) might drop a call and/or bearer to free memory resources and maintain device stability. However, this may lead to a diminished end user experience. Another option to address this problem is to increase modem memory. However, this may have a directly proportional effect to cost and size of the baseband chipset.

In LTE Wi-Fi Aggregation (LWA) and LTE DC (e.g., LTE DC subcarrier) cases, for example, the reordering requirement may increase, putting further strains on available modem memory. For example, LWA may put a considerable strain on modem memory due to the sheer volume of the data transmission across two separate links but meant for the same transport stream. Additionally or alternatively, LWA may put an additional strain on memory due to differences in latencies across the two links. For example, packets sent over a faster link may need to wait until packets arrive over the slow link such that the packets can be reordered and sent in order to the application processor (AP). Reordering may therefore be required across links to provide in-order data delivery to the application processor (e.g., host). It should be noted that although packets might be reordered within each link, they may still be out of order at the PDCP level.

Application processors (e.g., host processors) may often have larger CPU and/or memory configurations than the modem processor. Accordingly, some configurations of the systems and methods disclosed herein may utilize the application processor (e.g., host) memory to buffer packets (e.g., Internet protocol (IP) packets) until the order can be determined. This may offload the memory requirements at the electronic device (e.g., UE) and may work with smaller memory configurations. Some configurations of the systems and methods disclosed herein may utilize the application processor and/or application processor memory (e.g., host) for assistance in reordering packets received over WAN links. Some approaches may utilize application processor (e.g., host) logic to reorder packets received over a wide area network (WAN) (e.g., wireless WAN (WWAN)). This may offload the memory and processing (e.g., CPU) requirements at the electronic device (e.g., UE) and may work with smaller memory configurations.

Some configurations of the systems and methods disclosed herein may provide approaches for reducing modem memory impact. In some configurations, out of order data may be transmitted to the application processor, but completion indications may be in order. The out of order data may be buffered in application processor memory until the order is determined.

The systems and methods disclosed herein may provide approaches to maintain a hardware (HW) offload data path. These approaches may be utilized for cases where the application processor (e.g., central processing unit (CPU)) is not involved in modem to tethered client transfers, such as universal serial bus (USB) and/or Wi-Fi tethered client transfers.

Some configurations of the systems and methods disclosed herein may not expose reordering logic in the modem to the application processor. Changes may be abstracted at the link transport protocol level. For example, the application processor may consume data in an order of completion indicated by the modem. In some approaches, the systems and methods disclosed herein may have no impact to upper networking layers on the application processor (e.g., host), since packets may be provided by the transport driver in order.

In some configurations, the modem may optionally perform aggregation to increase throughput efficiency. Aggregation efficiency may increase when larger in-order sequences arrive on each link in high throughput scenarios.

The modem (e.g., modem processor) may flush outstanding out of order completions to the application processor when the reordering timer expires. In some approaches, this may not impact original reordering requirements. Additionally or alternatively, the modem may flush outstanding out of order completions to the application processor when certain reordering packet/byte thresholds are hit. This may avoid increasing the application processor memory footprint considerably.

Some configurations of the systems and methods disclosed herein may be applicable to single or multiple receive (Rx) links. For example, the systems and methods disclosed herein may be applicable to a single LTE link, dual LTE links, and/or LWA links. Additionally or alternatively, the systems and methods disclosed herein may be applicable to all cases of modem reordering at the L2 level where application processor buffers may be used instead of modem memory.

It should be noted that the systems and methods disclosed herein may be utilized and/or implemented with more than two links in some configurations. For example, an electronic device may receive data (e.g., packet data) on three or more links in some cases and/or approaches. For instance, an electronic device may receive data on two cellular (e.g., LTE) links and a Wi-Fi link. In another example, an electronic device may receive data on multiple Wi-Fi links and one or more cellular (e.g., LTE) links. In yet another example, an electronic device may receive data on a cellular (e.g., LTE) link, on a personal area network (PAN) (e.g., Bluetooth) link, and on a Wi-Fi link. Other variations are possible (e.g., three or more wireless local area network (WLAN) links, three or more WWAN links, three or more PAN links, a combination of WLAN, WWAN, and/or PAN links, etc.). The data may be received out of order and may be reordered in accordance with some configurations of the systems and methods disclosed herein. Although some examples and/or configurations may be described in terms of two links herein, some configurations of the systems and methods disclosed herein may be applied to more than two links.

Some configurations of the systems and methods disclosed herein may provide approaches for reducing modem memory impact. In some configurations, out of order data may be transmitted to the application processor (e.g., host) with reordering information. In some configurations, the reordering information may include link and bearer IDs in metadata per packet. The out of order data may be buffered in application processor memory until the order is determined.

Reordering information (e.g., sequencing information) may be provided by the modem device for each packet transmitted to the application processor (e.g., host). For example, the reordering information may be provided in metadata. The application processor may provide (e.g., consume, process, utilize, etc.) data in an order specified by the packet metadata.

In some configurations, the metadata may be part of the mux and/or aggregation protocol negotiated with the application processor (for packet data transmission). This may utilize the same transfer channel to send data and sequence information. Alternatively, metadata may be provided on a separate channel and may use a packet identifier to relate to transmitted packets. In some approaches, the systems and methods disclosed herein may have no impact on upper networking layers on the application processor (e.g., host), since packets may be provided by the transport driver in order.

Packet aggregation may not be affected by some configurations of the systems and methods disclosed herein. For example, full frame aggregation is possible, which may reduce the impact on the transport driver and increase link throughput.

The modem device (e.g., modem processor) may send commands to flush outstanding out of order (OOO) packets in the application processor (e.g., host) when a reordering timer expires. The modem device may only maintain sequence information for determining holes and not the actual packets. Different reordering thresholds (e.g., a packet-based threshold, a byte-based threshold, etc.) may be maintained at the modem device to trigger the flush. In this case, the application processor (e.g., host) may preconfigure the maximum memory requirement to the modem device beforehand. Accordingly, the modem device may avoid a memory exhaustion condition in the application processor (e.g., host). Flush commands may be sent on the same transfer channel to maintain ordering or on a different control channel Alternatively, the application processor (e.g., host) may have information regarding OOO packets written onto application processor memory. In the event that application processor (e.g., host) memory nears exhaustion, the application processor may flush currently ordered packets to the network stack and recover from the low memory situation. The application processor may inform the modem device of the highest sequence number flushed. The modem device may restart a reordering timer for the next valid hole. In some configurations, all reordering logic may reside in the application processor (e.g., host). For example, the application processor may include logic for running reordering timers.

Some configurations of the systems and methods disclosed herein may be applicable to multiple receive (Rx) link combinations (e.g., dual LTE, LWA, etc.). Some configurations of the systems and methods may be applicable to cases where WAN Rx reordering logic may be performed on an application processor (e.g., host) based on reordering (e.g., sequencing) information.

Some configurations of the systems and methods disclosed herein may offer additional savings on the modem device. For example, the systems and methods disclosed herein may reduce modem device complexity and may help reduce hardware (HW) area. Additionally or alternatively, modem central processing unit (CPU) million instructions per second (MIPS) may be reduced, which may lead to development of a low cost modem processor (e.g., modem CPU).

In some configurations of the systems and methods disclosed herein, the modem may provide a sequence number for each packet to an application processor (e.g., host), such that the application processor may perform reordering. Several variations of the systems and methods disclosed herein may be implemented. In some approaches, the application processor (e.g., host) may perform reordering without the modem performing any reordering. For example, the application processor may perform reordering based on sequence numbers, including starting reordering timers and/or flushing packets upon timer expiry. These approaches may be beneficial because they may reduce modem processor load.

In some approaches, the modem (e.g., modem processor) may perform some reordering (e.g., may run some portion(s) of reordering logic), providing assistance to the application processor in performing reordering. For example, the modem may run reordering timers and/or may send flush commands upon timer expiry. These approaches may provide certain advantages, such as reduced complexity on the host side and/or reducing delays and/or reducing link power consumption. For example, the application processor (e.g., host) may not be aware when a packet arrives over the air link into the modem. There may be delays due to accumulation of packets before delivery to the host over the interconnect link (this may be done to save link power). Accordingly, having the application processor (e.g., host) run reordering timers may end up buffering OOO packets for longer than required in some cases.

Some configurations of the systems and methods disclosed herein may enable high throughput data reception, particularly in implementations with limited or inadequate modem memory. For example, modem memory may have a capacity that does not allow buffering all of the packets received (particularly with multiple RATs) without frequent flushes (before the expiration of a reordering timer, for instance). For instance, for an aggregate downlink (DL) rate of 1.3 gigabits per second (Gbps) with 700 megabits per second (Mbps) over a WLAN and 600 Mbps over LTE, one estimate of the additional memory required for reordering in modem (e.g., modem device) memory is about 16 megabytes (MB). This may be a significant increase to configurations of 128 MB or 256 MB of total RAM for modem devices (e.g., mobile device modems (MDMs)). Some configurations of the systems and methods disclosed herein may avoid needing to add memory capacity in a modem device. Another benefit of the systems and methods disclosed herein may be reduced cost and/or size for a modem device, since a larger memory may not be needed to accommodate higher throughput data reception. Another benefit of some configurations of the systems and methods disclosed herein may be that reordering logic may not need to be exposed to the application processor. For example, application processor procedures may not need to be changed to accommodate some configurations of the systems and methods disclosed herein. Another benefit of some configurations of the systems and methods disclosed herein may include reduced modem processing. For example, a modem may avoid performing all of the reordering processing since the application processor may perform some or all of the reordering in some configurations.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1A is a diagram illustrating one example of an electronic device 102 in which systems and methods for reordering data may be implemented. Examples of the electronic device 102 include smartphones, cellular telephones, tablet devices, laptop computers, cameras, desktop computers, gaming consoles, televisions, appliances, etc. In some configurations, the electronic device 102 may communicate with one or more remote devices. For example, the electronic device 102 may communicate with an antenna 104 associated with a base station (BS) 106. The BS 106 may communicate with one or more networks. For instance, the BS 106 may communicate with the public land mobile network (PLMN) 108, the public switched telephone network (PSTN, not shown), and/or another network 110 (e.g., the Internet). It is also possible that the PLMN 108 communicates with the network 110 (e.g., the Internet) either directly or through an intervening network (e.g., the PSTN).

It should be noted that the electronic device 102 may communicate with multiple networks and/or may utilize multiple communication interfaces to communicate with one or more networks in some configurations. For example, the electronic device 102 may include and/or utilize one or more wireless and/or wireline communication interfaces (e.g., transceiver(s), modem(s), etc.). For instance, the electronic device 102 may include and/or utilize an Institute of Electrical and Electronic Engineers (IEEE) 802.11 (Wi-Fi) interface, a cellular (e.g., LTE, 3G, CDMA, etc.) interface, a Bluetooth interface, a USB interface, an Ethernet interface, etc. In some configurations, the electronic device 102 may utilize multiple communication interfaces concurrently. For example, the electronic device 102 may communicate with a network (e.g., one or more network devices, web server(s), etc.) over LTE and Wi-Fi concurrently.

It should be noted that the electronic device 102 may allow for various types of communication with elements of the network 110. For example, the electronic device 102 may make a phone call, send a text message, access streaming audio, access streaming video, and/or browse the web, etc. Such functions may be enabled through applications stored in the memory of the electronic device 102 and using the wireless transceiver of the electronic device 102.

Figure 1B:
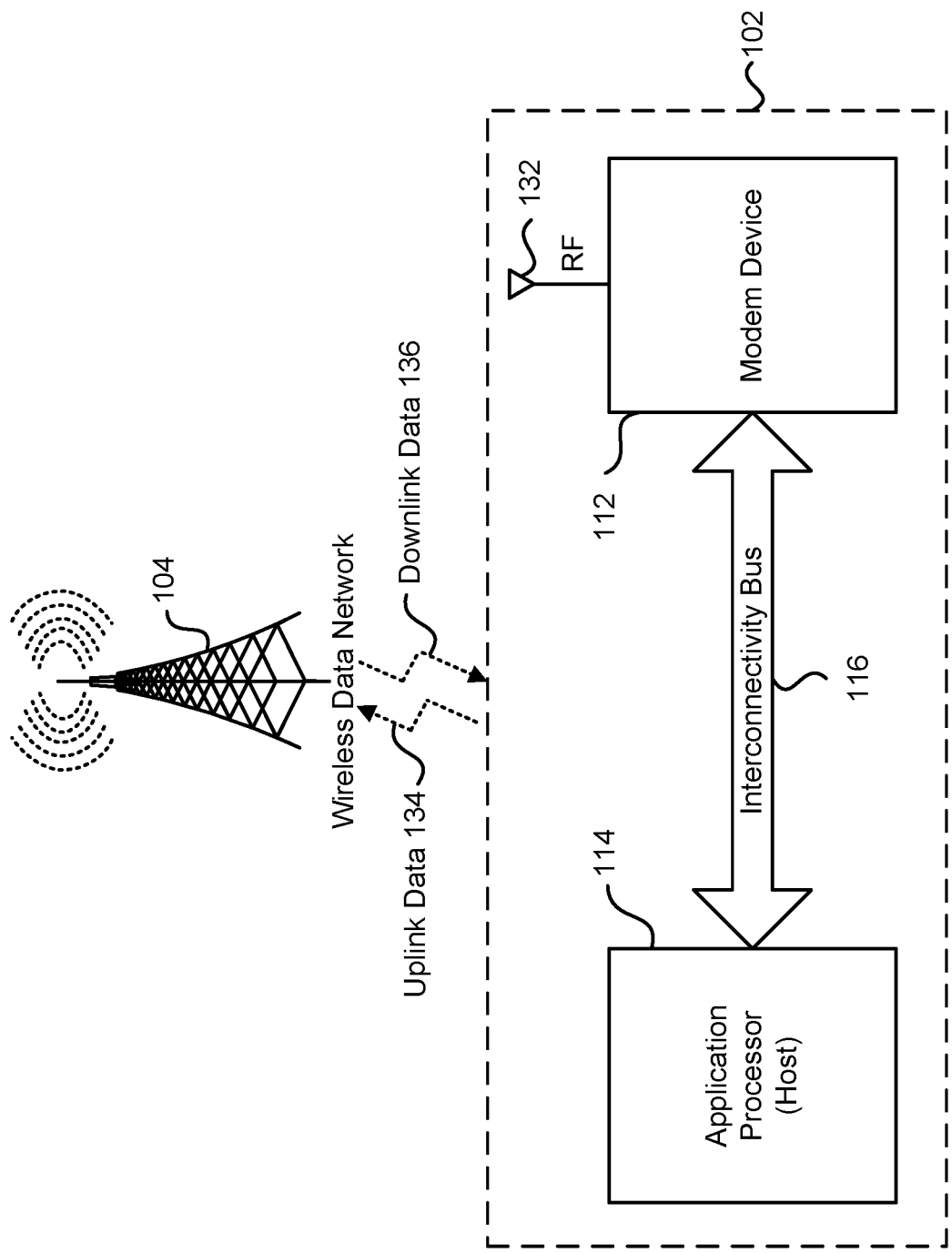
FIG. 1B is a block diagram illustrating a more specific example of an electronic device.

FIG. 1B is a block diagram illustrating a more specific example of an electronic device 102. The electronic device 102 may send signals (e.g., uplink data 134) to one or more antennas 104 associated with a base station. For example, a data transfer from the modem device 112 to the network may be referred to as uplink data 134. The electronic device 102 may receive signals (e.g., downlink data 136) from the remote antenna 104 at an antenna 132 of the electronic device 102. For example, a data transfer from the network to the modem device 112 may be referred to as downlink data 136. The data may be initially processed at a modem device 112 (e.g., mobile device modem (MDM)) of the electronic device 102 and passed to an application processor 114 (e.g., host) by an interconnectivity bus 116. In some configurations, the application processor 114 may be a host and the modem device 112 may be an MDM in accordance with the peripheral component interconnect express (PCIe) standard. While some implementations may operate over a PCIe-compliant interconnectivity bus 116, other examples of the interconnectivity bus 116 may comply with other standards such as High Speed Interconnect (HSIC), Universal Asynchronous Receiver/Transmitter (UART), universal serial bus (USB), etc.

In some configurations, the modem device 112 may be implemented in hardware (e.g., circuitry), hardware and firmware and/or hardware and software. For example, the modem device 112 may be included in a chipset and/or a network interface card (NIC). In some implementations, a router and/or an additional modem may be external to the electronic device 102. For example, the electronic device 102 may couple to one or more networks through a router and a cable modem. Even when such external router(s) and/or modem(s) are present, the electronic device 102 may have an internal modem device 112 to effectuate communication with other devices in some configurations.

Figure 2:
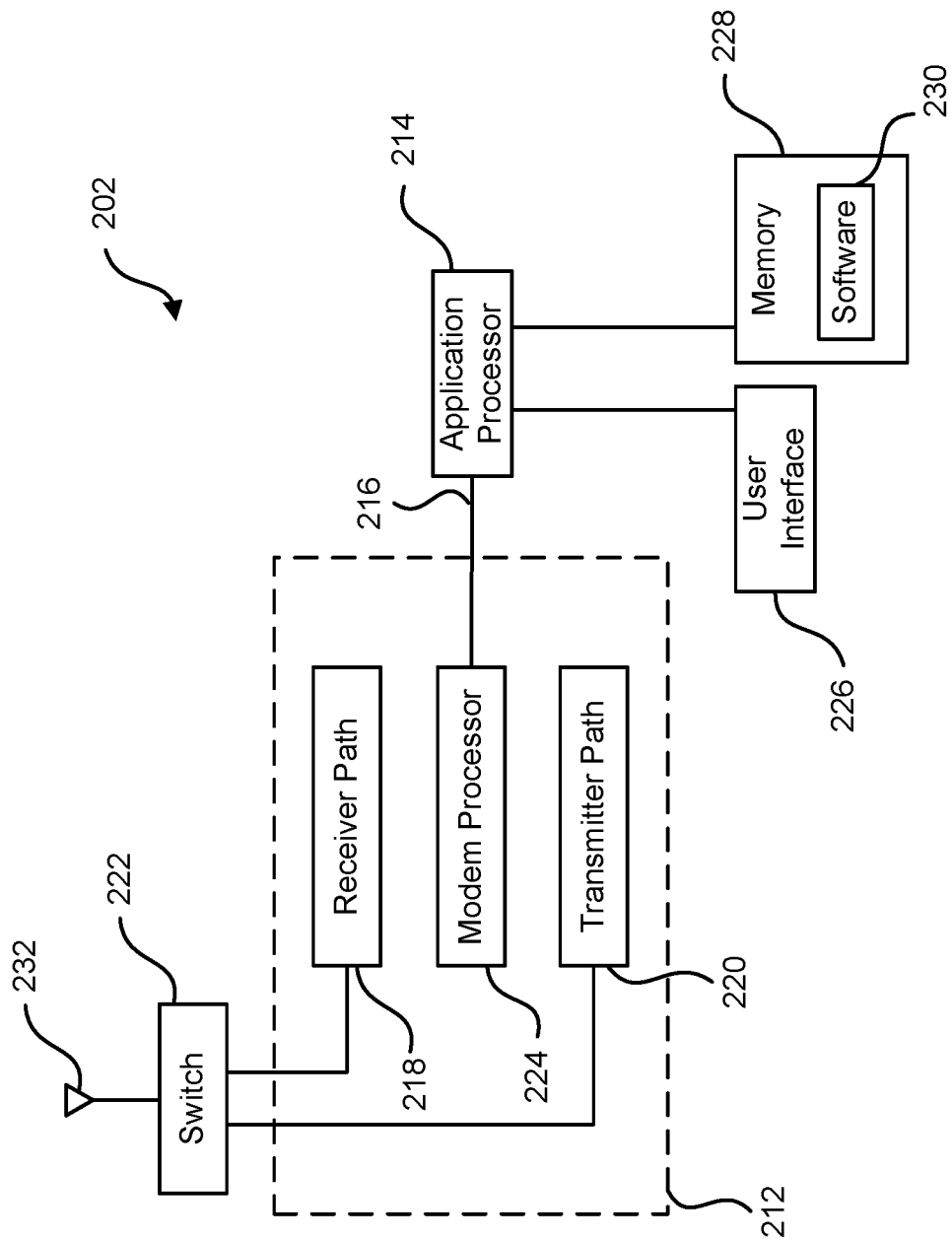
FIG. 2 is a block diagram illustrating a more specific example of an electronic device.

FIG. 2 is a block diagram illustrating a more specific example of an electronic device 202. The electronic device 202 described in connection with FIG. 2 may be one example of the electronic device 102 descried in connection with one or more of FIGS. 1A-1B. In particular, FIG. 2 illustrates examples of some components that may be implemented in the electronic device 202. The electronic device 202 may include a receiver path 218, a transmitter path 220, the antenna 232 (which may be an example of the antenna 132 described in connection with FIG. 1B), a switch 222, a modem processor 224, and the application processor 214 (e.g., host, host processor, etc.). The application processor 214 and the modem processor 224 may be linked (e.g., connected) by the interconnectivity bus 216. The application processor 214 and/or a control system (if present) may interoperate with a user interface 226 and memory 228 (e.g., application processor memory) with software 230 stored therein.

The receiver path 218 may include a low noise amplifier, a filter, and/or down conversion and digitization circuitry. The receiver path 218 receives information bearing radio frequency (RF) signals from one or more remote transmitters (e.g., base station(s), router(s), access point(s), etc.). The low noise amplifier (not shown) may amplify the signal. The filter (not shown) may reduce broadband interference in the received signal. The down conversion and digitization circuitry (not shown) may down convert the filtered received signal to an intermediate or baseband frequency signal. The baseband frequency signal may be digitized into one or more digital streams. The receiver path 218 may use one or more mixing frequencies generated by a frequency synthesizer.

The modem processor 224 may include a base band processor (not shown) that processes the digitized received signal to extract the information or data bits conveyed in the signal. In some configurations, the base band processor may be implemented with and/or in one or more digital signal processors (DSPs) within the modem processor 224 or as a separate integrated circuit (IC).

On the transmit side, the modem processor 224 may receive digitized data from the application processor 214. The digitized data may represent voice, data, and/or control information. The modem processor 224 may encode the digitized data for transmission. The encoded data is output to the transmitter path 220, where it may be utilized by a modulator (not shown) to modulate a carrier signal at a transmit frequency. An RF power amplifier (not shown) may amplify the modulated carrier signal for transmission, and may deliver the amplified and modulated carrier signal to the antenna 232 through the switch 222. The modem processor 224, the receiver path 218, and/or the transmitter path 220 may be included in a modem device 212 (e.g., a wireless modem). In some configurations, the modem device 212 may operate in accordance with one or more wireless standards. For example, the modem device 212 may operate in accordance with one or more standards such as Bluetooth, IEEE 802.11 standards, Universal Mobile Telecommunications System (UMTS), High Speed Packet Access (HSPA), Long Term Evolution (LTE), and/or other wireless protocols.

In some configurations, a user may interact with the electronic device 202 via the user interface 226. The user interface 226 may include and/or operate in conjunction with one or more interface devices (e.g., microphone(s), speaker(s), keypad(s), touchscreen(s), display(s), controller(s), a mouse, etc.). For example, audio information encoded in a received signal may be recovered by the base band processor and converted into an analog signal for driving the speaker. A touchscreen (and/or keypad with a display) may enable the user to interact with the electronic device 202. For example, the touchscreen may enable the user to input numbers to be dialed, access information (e.g., contacts, etc.), play games, view photos and videos, access webpages, etc. In some configurations, the memory 228 may have the software 230 for implementing one or more aspects of the systems and methods disclosed herein.

The electronic device 202 may include an interconnectivity bus 216. An example of the interconnectivity bus 216 is a PCIe interconnectivity bus that operates in accordance with PCIe standards.

Figure 3:
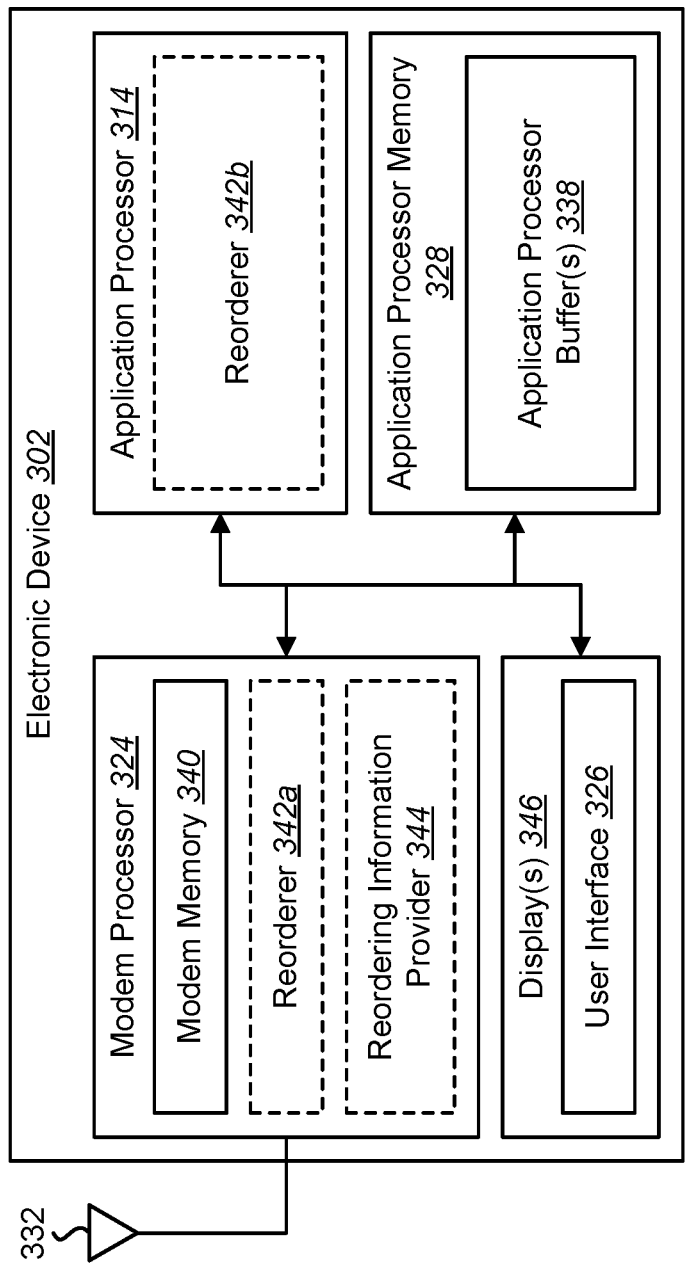
FIG. 3 is a block diagram illustrating one example of an electronic device in which systems and methods for reordering data may be implemented.

FIG. 3 is a block diagram illustrating one example of an electronic device 302 in which systems and methods for reordering data may be implemented. Examples of the electronic device 302 include cellular phones, smart phones, computers (e.g., desktop computers, laptop computers, etc.), tablet devices, media players, cameras, video camcorders, digital cameras, televisions, vehicles, automobiles, personal cameras, wearable cameras, virtual reality devices (e.g., headsets), augmented reality devices (e.g., headsets), mixed reality devices (e.g., headsets), robots, aircraft, drones, unmanned aerial vehicles (UAVs), smart appliances, healthcare equipment, gaming consoles, personal digital assistants (PDAs), set-top boxes, appliances, etc. The electronic device 302 may include one or more components or elements. One or more of the components or elements may be implemented in hardware (e.g., circuitry), a combination of hardware and firmware, and/or a combination of hardware and software (e.g., a processor with instructions).

In some configurations, the electronic device 302 may perform one or more of the functions, procedures, methods, steps, etc., described in connection with one or more of FIGS. 1A-27. Additionally or alternatively, the electronic device 302 may include one or more of the structures described in connection with one or more of FIGS. 1A-27.

In some configurations, the electronic device 302 may include an application processor 314, an application processor memory 328, a modem processor 324, and/or one or more display(s) 346. The application processor 314 may be coupled to (e.g., in electronic communication with) the application processor memory 328, modem processor 324, and/or display(s) 346. It should be noted that one or more of the elements of the electronic device 302 described in connection with FIG. 3 (e.g., display(s) 346, etc.), may be optional and/or may not be included (e.g., implemented) in the electronic device 302 in some configurations. Examples of the application processor 314, the application processor memory 328, the modem processor 324, and/or the modem memory 340 are given in connection with one or more of FIGS. 6 and 18.

The application processor 314 may execute one or more applications on the electronic device 302. In some configurations, the application processor 314 may be a general-purpose single- or multi-chip microprocessor (e.g., an Advanced RISC (reduced instruction set computing) Machine (ARM)), a special-purpose microprocessor (e.g., a digital signal processor (DSP)), a microcontroller, a programmable gate array, etc. In some configurations, the application processor 314 may be a central processing unit (CPU) and/or a host. Although the application processor 314 is shown in the electronic device 302, in an alternative configuration, a combination of processors (e.g., an ARM and a digital signal processor (DSP), etc.) could be used.

The application processor memory 328 may be any electronic component capable of storing electronic information. For example, the application processor memory 328 may be implemented as random access memory (RAM), read-only memory (ROM), magnetic disk storage media, optical storage media, flash memory devices in RAM, on-board memory included with the processor, EPROM memory, EEPROM memory, registers, and so forth, including combinations thereof. In some configurations, the application processor memory 328 may be implemented as double data rate (DDR) synchronous dynamic random-access memory (SDRAM).

The application processor memory 328 may store instructions and/or data. The application processor 314 may access (e.g., read from and/or write to) the application processor memory 328. The instructions may be executable by the application processor 314 to implement one or more functions, procedures, steps, etc. Executing the instructions may involve the use of the data that is stored in the application processor memory 328. When the application processor 314 executes the instructions, various portions of the instructions may be loaded onto the application processor 314 and/or various pieces of data may be loaded onto the application processor 314. Examples of instructions and/or data that may be stored by the application processor memory 328 may include received data, packet data, etc.

The display(s) 346 may be integrated into the electronic device 302 and/or may be coupled to the electronic device 302. Examples of the display(s) 346 include liquid crystal display (LCD) screens, light emitting display (LED) screens, organic light emitting display (OLED) screens, plasma screens, cathode ray tube (CRT) screens, etc. In some implementations, the electronic device 302 may be a smartphone with an integrated display. In another example, the electronic device 302 may be coupled to one or more remote displays 346 and/or to one or more remote devices that include one or more displays 346.

In some configurations, the electronic device 302 may present a user interface 326 on the display(s) 346. For example, the user interface 326 may enable a user to interact with the electronic device 302. For example, the user interface 326 may receive a touch, a mouse click, a gesture, and/or some other indication that indicates an input (e.g., a command to access a webpage, make a phone call, stream audio, stream video, etc.).

The modem processor 324 may enable the electronic device 302 to communicate with one or more other electronic devices. For example, the modem processor 324 may be included within and/or may provide one or more interfaces for wired and/or wireless communications. In some configurations, the modem processor 324 may be coupled to one or more antennas 332 for transmitting and/or receiving radio frequency (RF) signals. Additionally or alternatively, the modem processor 324 may enable one or more kinds of wireline (e.g., Universal Serial Bus (USB), Ethernet, etc.) communication. It should be noted that the term "couple" and variations thereof may denote a direct connection (without intervening components) or an indirect connection (with one or more intervening components).

In some configurations, the modem processor 324 may be coupled to and/or perform processing for one or more modems (e.g., modems for different radio access technologies (RATs)). For example, the modem processor 324 may perform processing for a cellular (e.g., 3G, Long Term Evolution (LTE), CDMA, etc.) modem and a wireless local area network (WLAN) modem (e.g., Institute of Electrical and Electronics Engineers (IEEE) 802.11 interface). It should be noted that the electronic device 302 may include one or more additional communication interfaces in some configurations (e.g., an Ethernet interface, a universal serial bus (USB) interface, etc.).

The modem processor 324 may send information (e.g., data packet(s), etc.) to and/or receive information from one or more other devices (e.g., multiple radio access technologies (RATs)). For example, the modem processor 324 may receive a first set of data packets from a first RAT and a second set of data packets from a second RAT, where the first set of data packets and the second set of data packets are from a data stream. A data stream may be a stream of data from a single source (e.g., application, device, etc.) in some configurations. For example, a data stream may be a stream of data for a particular streaming video, for a particular webpage, for a voice over Internet Protocol (VOIP) stream, etc. In some cases, the modem processor 324 may receive packets out of order. For example, the modem processor 324 may receive packets out of order due to packet loss, packet retransmission, packets received over multiple links (e.g., multiple LTE links, LTE and Wi-Fi links, etc.), etc. In some configurations, the first RAT may be LTE and the second RAT may be Wi-Fi.

The modem processor 324 may include (and/or have access to) modem memory 340. The modem memory 340 may be limited in some configurations. As described above, the modem memory 340 may not be able to accommodate all received data (e.g., packets) in some cases, particularly in high data rate cases and/or multi-link cases.

The modem processor 324 may provide information (e.g., one or more data packets) to the application processor 314. For instance, the modem processor 324 may send out of order packets to the application processor 314 for buffering in application processor memory 328 (e.g., one or more application processor buffers 338). In one example, the modem processor 324 may provide at least a portion of the first set of data packets and/or a portion of the second set of data packets to the application processor.

The electronic device 302 may include a reorderer 342. In some configurations, the modem processor 324 may include and/or implement a reorderer 342a. In some configurations, the application processor 314 may include and/or implement a reorderer 342b. In some configurations, the reorderer 342a-b may be included and/or implemented on both the modem processor 324 and the application processor 314. Alternatively, the reorderer 342 may be implemented separately (e.g., in a separate chip, etc.).

In some configurations, the reorderer 342a may determine reordering information. For example, the reorderer 342a may determine one or more events (e.g., interface event(s)) based on packet sequence numbering. In some configurations, the reordering information may be and/or may include one or more completion events. The modem device (e.g., modem processor 324) may send the completion events to the application processor 314. The events may be sent in the correct order (e.g., in the order in which packets may be consumed by application processor 314). The modem device (e.g., modem processor 324) may perform reordering while the data (e.g., data packets) are stored in application processor buffers 338 (instead of modem memory 340 buffers, for example) and then provide completion events in a correct order for the application processor 314. It should be noted that the application processor 314 (itself, for instance) may not perform reordering in some configurations. The application processor 314 may follow directives from the modem processor 324 and consume data in the indicated order.

It should be noted that an interface may be an interface between a modem device and an application processor. While events may be described as interface events herein, it should be noted that the interface may be optional, where interface functions may be more generally performed by a modem device or modem processor.

In some configurations, the reorderer 342a may determine the reordering information by reordering events. The reordered events may be provided to the application processor 314, which may provide (e.g., consume, process, etc.) the (out of order) packet data from the application processor memory 328 in the order of the reordered events, resulting in reordered data packets. For example, the reorderer 342a may determine a first reordering information (e.g., reordered events) corresponding to the portion of the set of first data packets and a second reordering information (e.g., reordered events) corresponding to the portion of the set of second data packets. The first reordering information and/or the second reordering information may be provided to the application processor 314. The application processor 314 may provide (e.g., consume, process, utilize, etc.) the portion of the set of first data packets and/or the portion of the second set of data packets in accordance with the first reordering information and/or the second reordering information.

In some configurations, the reorderer 342*a* may determine the reordering information by reordering an out of order event ring based on sequence numbering. The reorderer 342*a* may provide the reordering information to the application processor 314 for an application processor event ring. More examples of approaches for reordering data (e.g., data packets) are given in connection with one or more of FIGS. 4-12 and 14-15.

In some configurations, the modem processor 324 may include and/or implement a reordering information provider 344. The reordering information provider 344 may provide reordering information to the application processor 314. In some configurations, the reordering information may include a sequence indicator. Additionally or alternatively, the reordering information may include a bearer indicator (e.g., bearer ID). The bearer indicator may indicate a particular data stream. Additionally or alternatively, the reordering information may include a link indicator (e.g., link ID). The link indicator may indicate a link (e.g., a RAT) corresponding to the data packets. In some approaches, the reordering information may be provided for each packet provided to the application processor 314. In some implementations, the reordering information may be provided as metadata with the data packets.

In some configurations, the modem processor 324 may maintain packet sequence information (e.g., only packet sequence information) for reordering. The modem processor 324 may maintain reordering timers for the last out of order sequence received on one or more of the multiple RATs. This sequence information may help the modem processor 324 to understand the gaps in packet delivery order, which the modem processor 324 may communicate accordingly to the application processor 314.

In some configurations, the modem processor 324 may control reordering logic in the application processor 314. This may enable the modem processor 324 to perform stopping, starting, and/or flushing out of order buffers in application processor memory 328. In some configurations, the modem processor 324 may bypass its own reordering logic. For example, the modem processor 324 may determine to completely bypass the reordering logic of the modem processor 324 (e.g., the modem processor 324 may not reorder buffers in either WAN links and may transmit packets as received from the network to the application processor (e.g., host)). This may save any reordering processing in the modem CPU, hence saving power and memory. It should be noted that some configurations of the systems and methods disclosed herein may be applied to any WAN technology that imposes requirements on modem memory/CPU to reorder packets received from the network.

In some configurations, the modem processor 324 may bypass one or more modem processor 324 packet reordering functions. For example, the modem processor 324 may detect one or more criteria (e.g., a threshold data rate, activation of multi-link communication (e.g., LWA, DC-LTE, etc.) for one or more data streams, etc.) for switching from modem processor-based reordering to application processor-assisted or application processor-based reordering. For example, the modem processor 324 may operate in a modem processor exclusive reordering mode, where the modem processor 324 performs packet reordering (only in modem memory 340, for example) and only submits in-order packets to the application processor 314. In a case that the modem processor 324 detects one or more criteria (e.g., at least a threshold data rate, activation of LWA, DC-LTE, etc.), the modem processor 324 may switch to an expanded reordering mode, where the modem processor 324 performs reordering in application processor memory 328 and/or where the application processor 314 performs reordering (e.g., reordering assistance or all reordering).

In some approaches, the first reordering information or the second reordering information may include a sequence indicator, a bearer indicator, and/or a link indicator for each of the data packets of the at least a portion of the first set of data packets or the at least a portion of the second set of data packets.

The application processor 314 may include a reorderer 342*b*. The reorderer 342*b* may reorder the data packets based on the reordering information. For example, the reorderer 342*b* may reorder the data packets based on sequence number, bearer indicator, and/or link indicator.

Reordering the data packets may include storing the data packets in the application processor memory 328 (e.g., one or more application processor buffers 338) based on the reordering information. For example, the reorderer 342*b* may store the (received out of order) packet data in one or more data structures (e.g., one or more linked lists, hash tables, min heaps, max heaps, red-black trees, etc.) in the application processor memory 328 based on the reordering information. In some configurations, the data structure(s) may be constructed and/or indexed based on the reordering information (e.g., sequence number(s), link indicator(s), and/or bearer indicator(s), etc.). Additionally or alternatively, reordering the data packets may include providing (e.g., consuming, processing, utilizing, etc.) the data packets based on the reordering information. For example, the reorderer 342*b* may enable the application processor 314 to provide (e.g., consume, process, utilize, etc.) the data packets in accordance with sequence numbers.

In some examples, the reorderer 342*b* may store the at least a portion of the first set of data packets corresponding to a first link (indicated by the link indicator, for instance) in a first data structure (e.g., a first linked list) and/or may store the at least a portion of the second set of data packets corresponding to a second link in a second data structure (e.g., a second linked list) in the application processor memory 328. Providing the data packets may include traversing the first linked list and/or the second linked list based on the first reordering information and/or the second reordering information.

In some examples, the reorderer 342*b* may store the at least a portion of the first set of data packets or the at least a portion of the second set of data packets in one or more elements of a data structure based on the first reordering information or the second reordering information. For instance, the data structure may include a hash table. The reorderer 342*b* may index the hash table based on the first reordering information and/or the second reordering information (e.g., sequence numbers). In some approaches, the reorderer 342*b* may store a set of consecutive packets in a linked list in at least one of the one or more elements of the hash table. More examples of approaches for reordering data (e.g., data packets) are given in connection with one or more of FIGS. 4 and 16-26.

It should be noted that one or more of the elements or components of the electronic device 302 may be combined and/or divided. For example, the modem processor 324 and the application processor 314 may be combined (e.g., combined into a single chip) in some configurations. In some implementations, the modem memory 340 and the application processor memory 328 may be different portions (e.g., partitions) of a single memory device. However, it should be noted that although the modem memory 340 and the application processor memory 328 may be implemented on a single device in some configurations, the modem memory 340 may not be accessible and/or directly controllable by the application processor 314 and/or the application processor memory 328 may not be accessible and/or directly controllable by the modem processor 324. For example, the modem processor 324 may have to send data to the application processor 314, where the application processor 314 may store the data in the application processor memory 328. Moreover, the application processor 314 may not be able to read and/or write into modem memory 340. In other configurations, the modem memory 340 may be included in a separate device (e.g., chip) from the application processor memory 328. Additionally or alternatively, the reorderer 342 may be divided into elements or components that perform a subset of the operations thereof.

Figure 4:
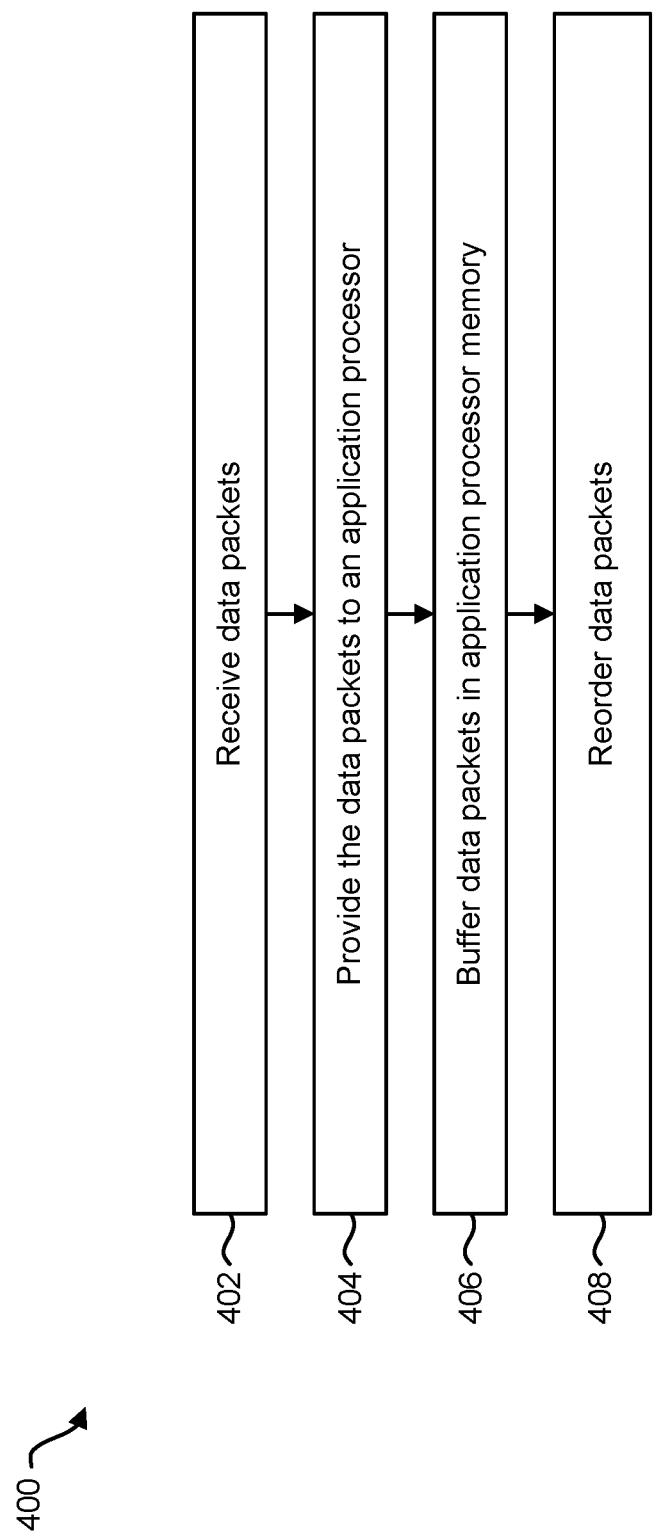
FIG. 4 is a flow diagram illustrating one configuration of a method for reordering data.

FIG. 4 is a flow diagram illustrating one configuration of a method 400 for reordering data. The method 400 may be performed by the electronic device 302 described in connection with FIG. 3.

The modem processor 324 may receive 402 data packets. This may be accomplished as described above in connection with FIG. 3 in some configurations. For example, the modem processor 324 may receive data packets over one or more links (corresponding to one or more RATs, for instance). In some cases, the data packets may be received out of order.

The modem processor 324 may provide 404 the data packets to an application processor 314. This may be accomplished as described in connection with FIG. 3 in some configurations. For example, the modem processor 324 may provide 404 at least a portion of the data packets (corresponding to one or more links, for instance) to the application processor 314. In some cases, the modem processor 324 may provide 404 the data packets to the application processor 314 out of order (e.g., in a non-continuous and/or non-contiguous order).

The electronic device 302 (e.g., application processor 314) may buffer 406 the data packets in application processor memory 328 (e.g., in one or more application processor buffers 338). This may be accomplished as described in connection with FIG. 3. For example, the application processor 314 may receive the data packets from the modem processor 324 and store the data packets in the application processor memory 328. In in some configurations, the application processor 314 may store the data packets in the application processor memory 328 based on reordering information from the modem processor 324. In some configurations, buffering 406 data packets in application processor memory may be performed to reduce buffering in a modem memory of the electronic device.

The electronic device 302 may reorder 408 data packets. This may be accomplished as described in connection with FIG. 3. In some configurations, the reordering 408 may be directed by the modem processor 324. For example, the modem processor 324 may determine reordering information and provide the reordering information to the application processor 314 in some configurations. The reordering information may indicate a consumption order (e.g., may direct the application processor 314 to consume the data packets in a particular order (e.g., in a reordered order)). Examples of approaches that may be related to modem processor 324 directed reordering may be given in connection with one or more of FIGS. 5-9 and 11-12 and 14-15.

In some configurations, the reordering 408 may be assisted by the application processor 314. For example, the modem processor 324 may provide reordering information (e.g., sequence indicator, bearer indicator, and/or link indicator, etc.) to the application processor 314. The application processor 314 may store the packet data in the application processor memory 328 based on the reordering information as described above. Reordering 408 may include storing the packet data in accordance with the reordering information. Reordering 408 may include providing (e.g., consuming) the data packets based on the reordering information. Examples of approaches that may be related to application processor 314 assisted reordering may be given in connection with one or more of FIGS. 16-26.

Figure 5:
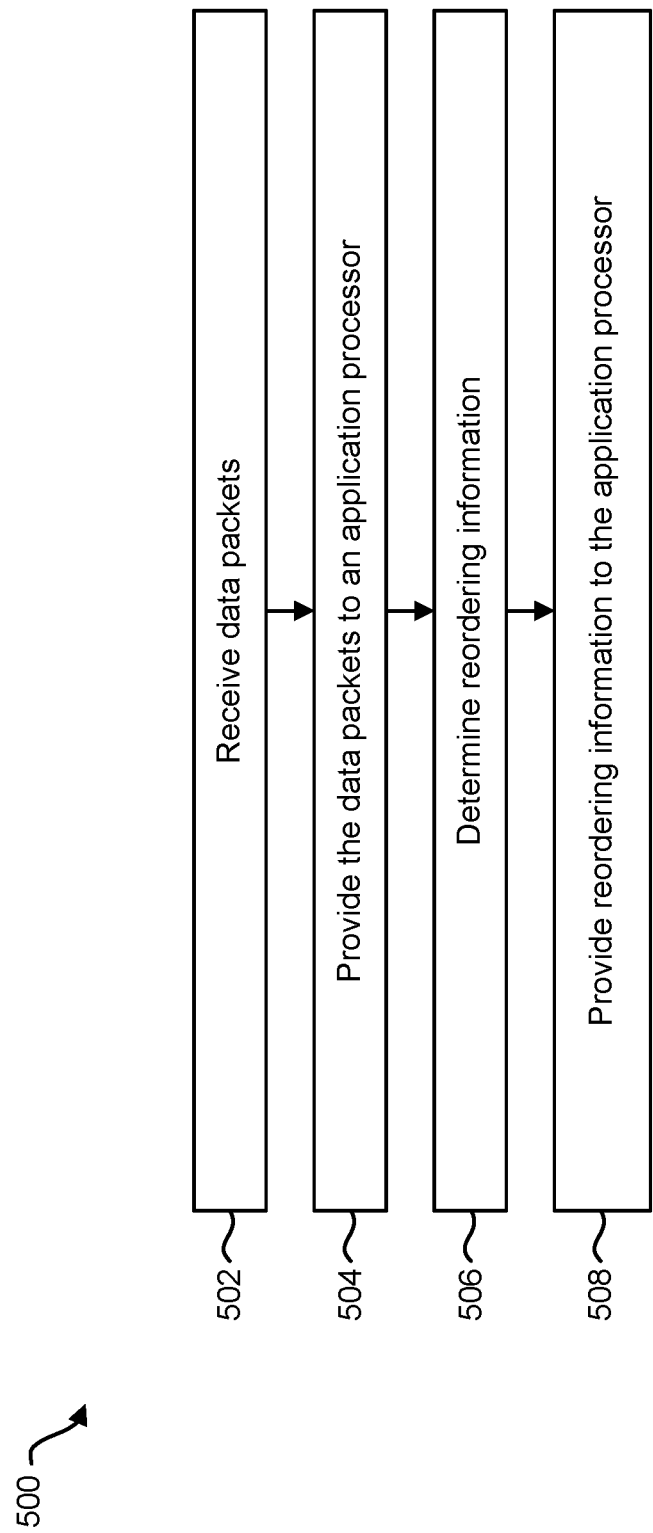
FIG. 5 is a flow diagram illustrating a more specific configuration of a method for reordering data.

FIG. 5 is a flow diagram illustrating a more specific configuration of a method 500 for reordering data. The method 500 may be performed by the electronic device 302 (e.g., the modem processor 324) described in connection with FIG. 3).

The modem processor 324 may receive 502 data packets. This may be accomplished as described above in connection with FIG. 3 in some configurations. For example, the modem processor 324 may receive data packets over one or more links (corresponding to one or more RATs, for instance). In some cases, the data packets may be received out of order.

The modem processor 324 may provide 504 the data packets to an application processor 314. This may be accomplished as described in connection with FIG. 3 in some configurations. For example, the modem processor 324 may provide 504 at least a portion of the data packets (corresponding to one or more links, for instance) to the application processor 314. In some cases, the modem processor 324 may provide 504 the data packets to the application processor 314 out of order (e.g., in a non-continuous and/or non-contiguous order). In some approaches, the data packets may be in contiguous order per each link, but may be in non-contiguous order between links. In other approaches, the data packets may be provided to the application processor 314 for storage regardless of whether the packets are in contiguous or non-contiguous order (in a single frame). The application processor 314 may store the data packets in application processor memory 328 (e.g., in one or more application processor buffers 338).

The modem processor 324 may determine 506 reordering information. This may be accomplished as described in connection with FIG. 3 in some configurations. For example, the modem processor 324 may determine an order of events (e.g., reordered events) for reordering data packets. Examples of determining 506 reordering information may be provided in connection with one or more of FIGS. 8-9 and 12.

The modem processor 324 may provide 508 reordering information to the application processor 314. This may be accomplished as described in connection with FIG. 3 in some configurations. Examples of providing 508 reordering information may be provided in connection with one or more of FIGS. 8-9 and 12. For instance, the modem processor 324 may provide reordered events to the application processor 314. The application processor 314 may provide (e.g., consume, process, utilize, etc.) the data packets based on the reordering information.

Figure 6:
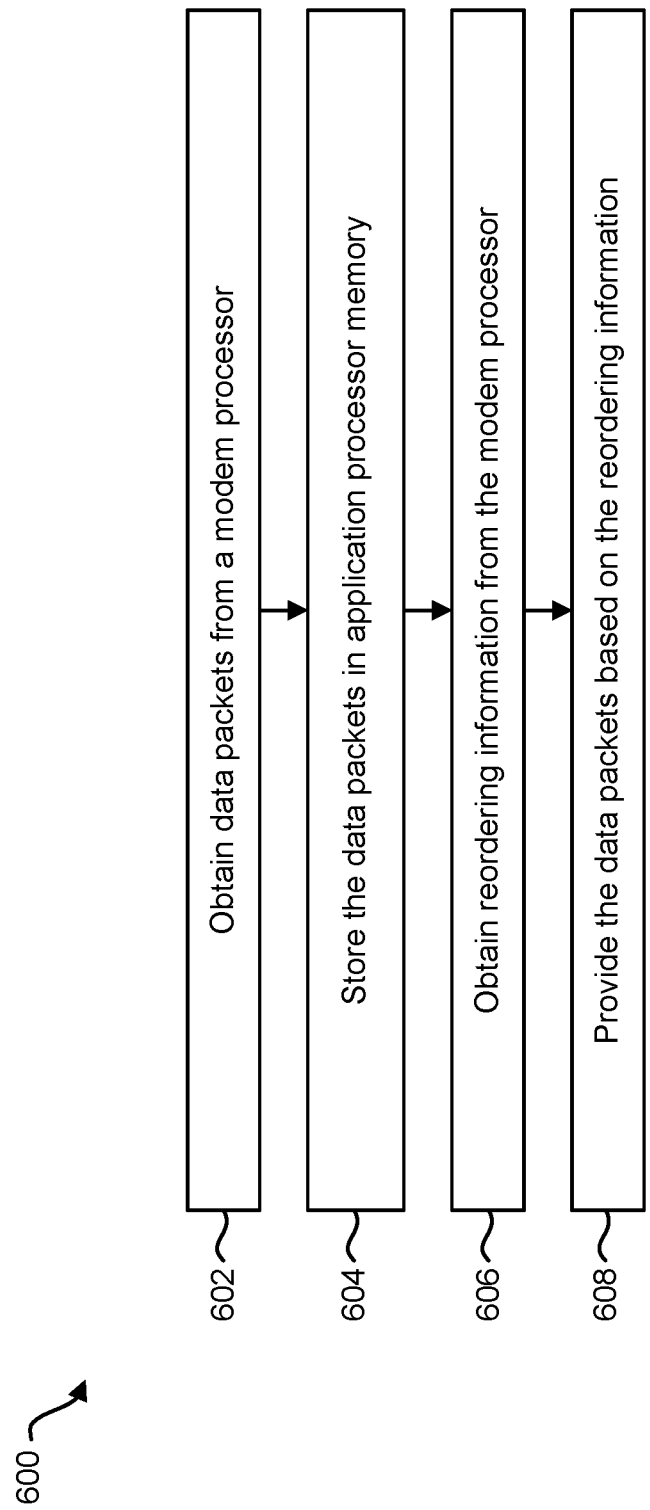
FIG. 6 is a flow diagram illustrating another configuration of a method for reordering data.

FIG. 6 is a flow diagram illustrating another configuration of a method 600 for reordering data. The method 600 may be performed by the electronic device 302 (e.g., the application processor 314) described in connection with FIG. 3.

The application processor 314 may obtain 602 data packets from a modem processor 324. This may be accomplished as described in connection with FIG. 3 in some configurations. For example, the application processor 314 may receive data packets out of order from the modem processor 324. The data packets may correspond to one or more links (from one or more RATs, for example).

The application processor 314 may store 604 the data packet(s) in application processor memory 328 (e.g., in one or more application processor buffers 338). This may be accomplished as described in connection with FIG. 3 in some configurations. For example, the application processor 314 may store 604 one or more packets (e.g., sets of data packets) in the application processor buffers 338. One or more of the sets of data packets may be in order (e.g., contiguous order) or may be out of order. Examples of storing 604 data packets c.

The application processor 314 may obtain 606 reordering information from the modem processor 324. This may be accomplished as described in connection with FIG. 3 in some configurations. For example, the application processor may obtain 606 a reordered set of events from the modem processor 324. Examples of obtaining 606 reordering information may be provided in connection with one or more of FIGS. 8-9 and 12.

The application processor 314 may provide 608 the data packets based on the reordering information. This may be accomplished as described in connection with FIG. 3 in some configurations. For example, the application processor 314 may provide 608 (e.g., consume, process, utilize, etc.) the data packets in an order indicated by the reordering information. Examples of providing 608 the data packets may be provided in connection with one or more of FIGS. 8-9 and 12.

Figure 7:
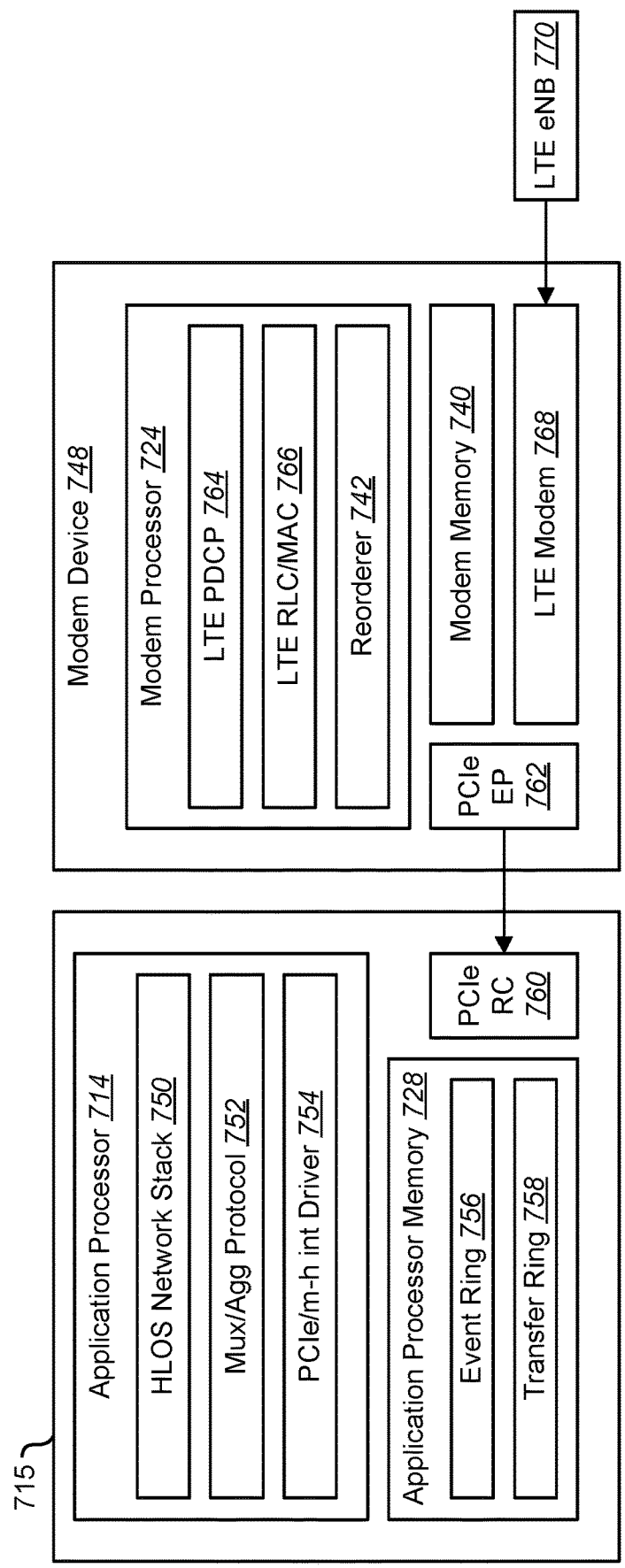
FIG. 7 is a block diagram illustrating an example of an application processor and a modem device.

FIG. 7 is a block diagram illustrating an example of an application processor (AP) 714 and a modem device 748 (e.g., MDM). In particular, this example illustrates a data transfer overview with data transfer over a PCIe interconnect (or other interface). The application processor 714 and modem device 748 described in connection with FIG. 7 may be examples of corresponding components described in connection with FIG. 3. In some configurations, the application processor 714, the application processor memory 728, and/or the PCIe RC 760 may be referred to as host components 715.

In some configurations, the modem processor 724 may include and/or implement an LTE PDCP layer 764 and/or an LTE RLC/MAC layer(s) 766. For example, the modem processor 724 may perform one or more functions corresponding to the LTE PDCP layer 764 protocol and/or one or more functions corresponding to the LTE RLC/MAC layer 766 protocol. In some configurations, the LTE PDCP 764 and LTE RLC/MAC 766 may implement layer 2 of the radio protocol stack, supporting segmentation, reassembly, ciphering, concatenation, reordering, and/or retransmission functions. The modem processor 724 may include a reorderer 742. In some configurations, the application processor 714 may include and/or implement a high level operating system (HLOS) network stack 750, a multiplexing/aggregation (mux/agg) protocol 752, and/or a PCIe modem-host interface (PCIe/m-h int (MHI)) driver 754. It should be noted that the mux/agg protocol 752 may not be included in the application processor 714 in some configurations.

In some configurations, the HLOS network stack 750 may implement transmission control protocol/Internet protocol (TCP/IP) protocols and/or one or more other functions. The mux/agg protocol 752 may be an optional protocol that may serve to support multiplexing of multiple data calls (e.g., multiple access point network/packet data network (APN/PDN) calls) over a single transport channel (e.g., PCIe, USB, and/or other transport). Additionally or alternatively, an aggregation function may be optionally implemented to allow transferring large chunks and/or transfers instead of individual IP packets, which may improve packet buffer memory usage and/or bandwidth of the interconnect. The PCIe/m-h int driver 754 may provide a mechanism to exchange packet data descriptors with the modem device 748.

In the example illustrated in FIG. 7, the modem device 748 (e.g., the MDM) may receive data (e.g., data packet(s)) from LTE and/or Wi-Fi (LWA) links. For example, the modem device 748 (e.g., LTE modem 768) may receive data from an LTE evolved Node B (eNB) 770. The modem device 748 may decipher (e.g., demodulate, decode, etc.) the data and move the data to application processor memory 728 (e.g., host memory) (e.g., memory in an application processor 714 and/or a tethered device) as specified by buffers in a destination transfer (Txfr) ring 758. The data may be moved over a PCIe interface (or other interface. For example, the PCIe endpoint (EP) 762 may send the data to the PCIe root complex (RC) 760.

In some approaches, multiple data packets may be aggregated into a single application processor memory buffer (e.g., host buffer). Aggregation parameters may be negotiated at call bring up time between the application processor 714 (e.g., host) and the modem device 748.

Completion information about the data transmission in the application processor memory buffers (e.g., host buffers) may be provided in the event (Evnt) ring 756. After events are written to the event ring 756, an interrupt may be generated to the application processor 714 (e.g., host), indicating data transfer completion.

The application processor 714 (e.g., host) may read the events in the event ring 756 to know about the buffers containing data. The application processor 714 may consume the buffers in an order specified by the modem device 748.

While some of the configurations described herein may utilize an event ring, it should be noted that other configurations may not include and/or may not rely on an event ring. In other words, the event ring may be used for completion in some specific implementations. Some configurations may more generally utilize application processor 714 (e.g., host) transfer buffers which may or may not include event rings. Accordingly, the systems and methods disclosed herein may apply to a variety of implementations for completion notification of transfer buffers to an application processor 714 (e.g., host), which may or may not use event rings. Thus, configurations that are described in terms of event rings may be alternatively implemented in transfer buffers without event rings. In some configurations, the modem device 748 (e.g., MDM) may optionally include one or more processors. The modem processor 724 may include a reorderer 742 in some configurations. Alternatively, the reorderer 742 may be implemented in the modem device 748 separate from the modem processor 724. In some approaches, the reorderer 742 may manage writing events to the event ring 756 to reorder out of order data packets.

Figure 8:
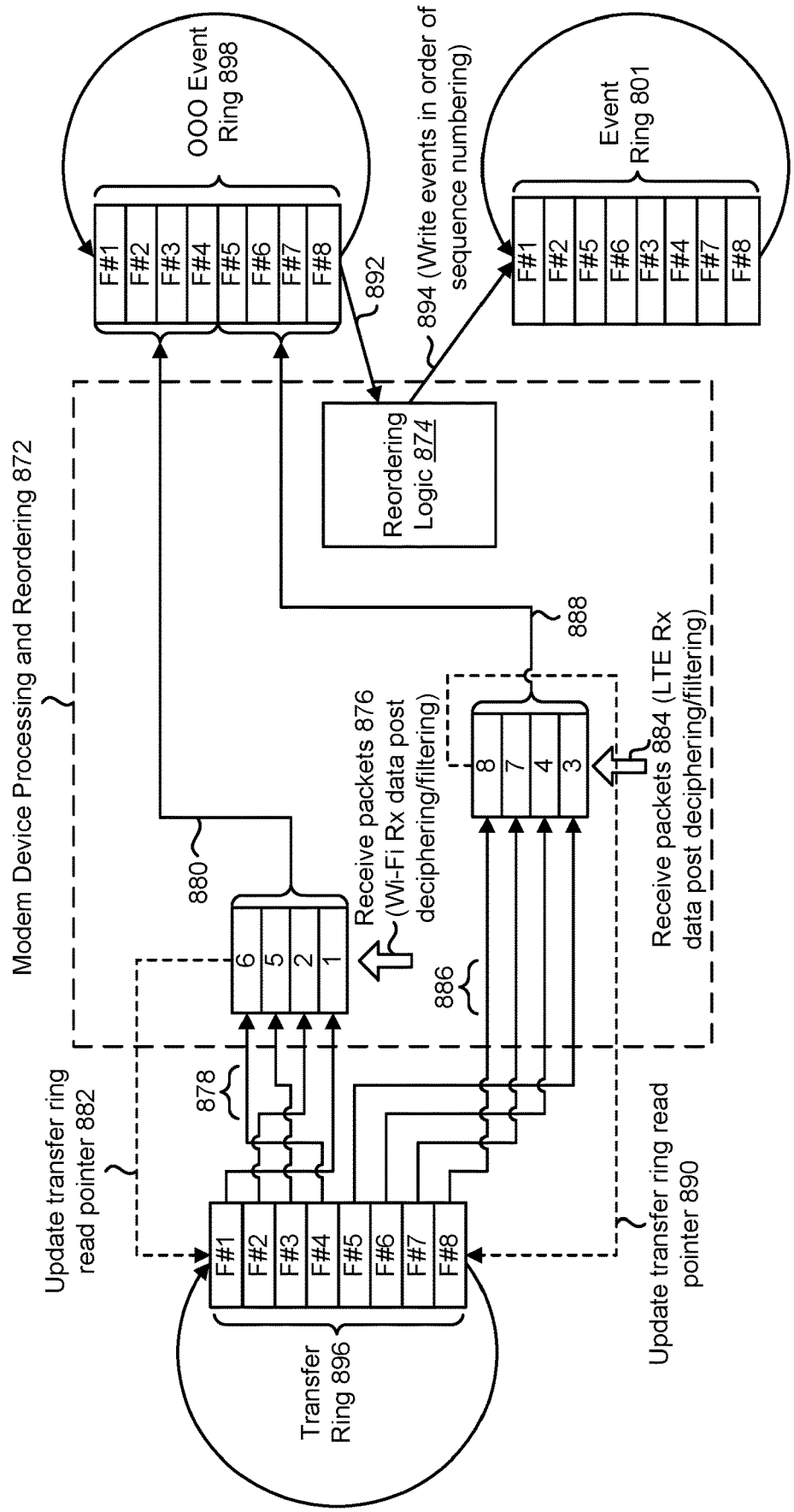
FIG. 8 is a diagram illustrating one example of an approach for reordering data in accordance with some configurations of the systems and methods disclosed herein.

FIG. 8 is a diagram illustrating one example of an approach for reordering data in accordance with some configurations of the systems and methods disclosed herein. In particular, FIG. 8 illustrates an example of modem device processing and reordering 872 (e.g., one or more functions performed by processing and/or reordering logic in the modem device). In the example described in connection with FIG. 8, no aggregation (e.g., data packet aggregation) may be performed. It should be noted that although Wi-Fi and LTE are used as examples of links in this example, one or more other link types may be utilized. The approach may operate in accordance with this example as follows.

A modem device (e.g., modem processor) may receive 876 packets (e.g., data packets (with sequence numbers) 1, 2, 5, and 6) over the wireless local area network (WLAN) receiver. The modem device may utilize 878 buffers pointed to in the application processor (e.g., host) transfer ring 896 (e.g., frames F#1, F#2, F#3, and F#4) to write packets (to application processor memory buffers, for example).

The modem device may write 880 an event (e.g., interface event for all Wi-Fi buffers to the out of order (OOO) event ring 898 (e.g., F#1, F#2, F#3, and F#4). Since frames F#1 and F#2 are in expected receive order, the reordering logic 874 (e.g., interface/reordering (interface/REO) logic) in the modem device may convert the OOO event to a modem-host interface (e.g., "m-h int," "MHI," etc.) event in the application processor (e.g., host) event ring 801 to indicate completion for frames F#1 and F#2 immediately. It should be noted that "modem-host interface" (e.g., "m-h int," MHI," etc.) is referred to herein as an example of one protocol that the systems and methods disclosed herein may be applied to. Some configurations of the systems and methods disclosed herein may be applied to other protocols instead (e.g., other protocols for communicating between the modem and host, other interfacing protocols, etc.). Accordingly, the configurations and/or approaches described herein may utilize a different protocol and/or a different interface instead of MHI in some implementations. The modem-host interface (m-h int) may be an interface between the application processor (e.g., host) and the modem device for communication over an interconnectivity bus (e.g., PCIe). At this point, the events for frames F#3 and F#4 (e.g., for packets 5 and 6) are still in the OOO event ring 898. The application processor (e.g., host) transfer ring 896 read pointer may be updated 882 for the application processor (e.g., host) to replenish transfer ring elements (TREs).

The modem device may receive packets 884 (e.g., data packets 3, 4, 7, and 8) over the LTE receiver. The modem device may utilize 886 buffers pointed to in the application processor (e.g., host) transfer ring 896 (e.g., read pointer) to write the packets (to application processor memory buffers, for example).

The modem device may write 888 events (e.g., interface events) for all LTE buffers (e.g., for packets 3, 4, 7, and 8) to the OOO event ring 898. The application processor (e.g., host) transfer ring 896 read pointer may be updated 890 for the application processor (e.g., host) to replenish TREs.

The modem device (e.g., reordering logic 874) may read 892 events from the OOO event ring 898 and reorder the events according to sequence number (SN). The modem device (e.g., reordering logic 874) may write 894 the events to the application processor (e.g., host) event ring 801 in an order corresponding to sequence numbering order (e.g., an order that enables consumption of packets in sequence numbering order). In this example, the event ring 801 order may correspond to the correct (e.g., reordered) packets. For instance, F#1 corresponds to packet 1, F#2 corresponds to packet 2, F#5 corresponds to packet 3, F#6 corresponds to packet 4, F#3 corresponds to packet 5, F#4 corresponds to packet 6, F#7 corresponds to packet 7, and F#8 corresponds to packet 8.

Figure 9:
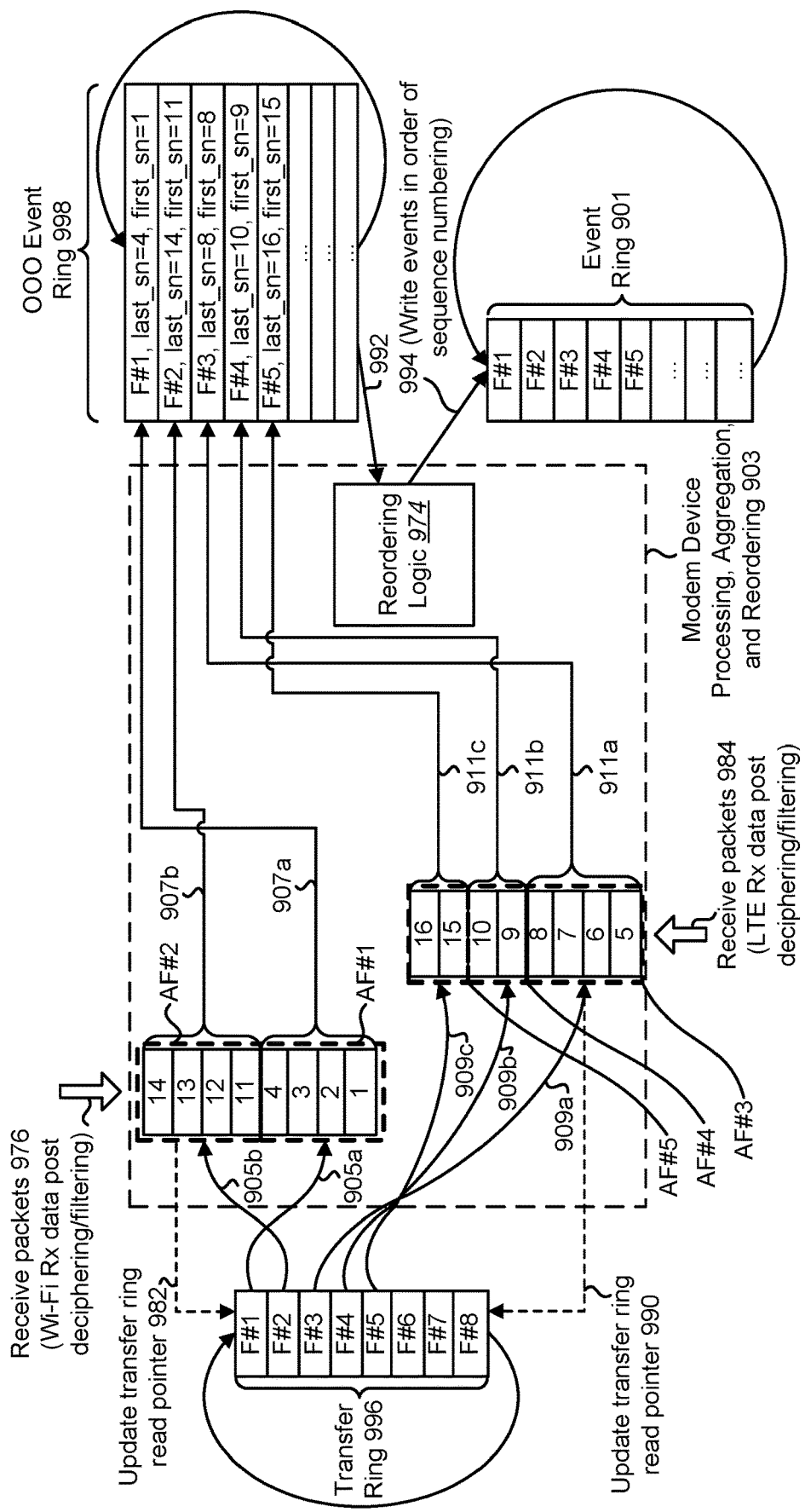
FIG. 9 is a diagram illustrating one example of another approach for reordering data in accordance with the systems and methods disclosed herein.

FIG. 9 is a diagram illustrating one example of another approach for reordering data in accordance with the systems and methods disclosed herein. In particular, FIG. 9 illustrates an example of modem device processing, aggregation, and reordering 903 (e.g., one or more functions performed by processing, aggregation, and/or reordering logic in the modem device). In the approach described in connection with FIG. 9, aggregation (e.g., data packet aggregation) may be supported. In particular, the approach described in connection with FIG. 9 enables aggregation of data packets with contiguous sequence numbers. It should be noted that although Wi-Fi and LTE are used as examples of links in this example, one or more other link types may be utilized. This approach may operate in accordance with this example as follows.

A modem device (e.g., modem processor) may receive 976 packets (e.g., data packets (with sequence numbers) 1-4 and 11-14) over the wireless local area network (WLAN) receiver. The modem device may utilize buffers pointed to in the application processor (e.g., host) transfer ring 996 to write packets (to application processor memory buffers, for example). The modem device may aggregate contiguously ordered packets in the same aggregation frame. In this example, the application processor (e.g., host) buffer may hold up to 4 packets, so data packets with sequence numbers 1-4 are aggregated 905a in aggregation frame 1 (AF#1).

The modem device may generate 907 an event (e.g., interface event) for frame 1 (e.g., F#1) on the out of order (OOO) event ring 998. For example, the modem device may write events in the order of aggregation frame generation. Since this is the expected receive order, the interface/reordering (interface/REO) logic in the modem device may convert the OOO event to a modem-host interface event in the application processor (e.g., host) event ring 901. An example of a structure for an application processor (e.g., host) event ring element (ERE) is described in connection with FIG. 10. An example of a structure for an out of order event ring element (OOO ERE) is described in connection with FIG. 11. As illustrated in FIG. 9, each OOO ERE may include a frame number (e.g., F#1), a last sequence number (e.g., last_sn=4), and a first sequence number (e.g., first_sn=1) for the aggregation frame (e.g., AF#1). The OOO ERE may indicate the range of contiguously ordered packets (e.g., 1-4) included in the corresponding aggregation frame.

Once the modem device detects a sequence number (SN) jump (e.g., discontinuity), a new aggregation frame (e.g., AF#2) may be formed 905b with data packets with sequence numbers 11-14. The event (e.g., interface event) for frame 2 (e.g., F#2) may be generated 907b in the OOO event ring 998. The application processor (e.g., host) transfer ring read pointer may be updated 982 for the application processor (e.g., host) to replenish TREs.

The modem device may receive 984 packets (e.g., data packets 5-8,9-10, and 15-16) over the LTE receiver. The modem device may aggregate 909a contiguously ordered packets up to the maximum aggregation threshold. In this example, data packets with sequence numbers 5-8 are aggregated in frame 3 (e.g., F#3). The event (e.g., interface event) for frame 3 (F#3) may be generated 911a in the OOO event ring 998.

The modem device may aggregate 909b data packets with sequence numbers 9-10 in frame 4. It should be noted that 2 (of 4 possible) packets may be aggregated due to the sequence number jump. The event (e.g., interface event) for frame 4 may be generated 911b in the OOO event ring. Since frames 3 and 4 are in contiguous order, the reordering (REO) logic in the modem device may generate an event (e.g., modem-host interface event) in the application processor (e.g., host) event ring 901. Consequently, frame 2 is also in contiguous order at this point, so the REO logic may generates an event (e.g., modem-host interface event) for frame 2 as well.

The modem device may aggregate 909c data packets with sequence numbers 15-16 in frame 5. The corresponding events (e.g., interface events) for frame 5 may be generated 911c in the OOO event ring. The application processor (e.g., host) transfer ring read pointer may be updated 990 for the application processor (e.g., host) to replenish TREs. The modem device (e.g., reordering (REO) logic 974) may generate 992 events (e.g., modem-host interface events) for all reordered events in the application processor (e.g., host) event ring 901. The modem device (e.g., reordering logic 974) may write 994 events in an order corresponding to sequence numbering order. As illustrated in FIG. 9, some approaches may support frame aggregation where one or more aggregated frames include contiguously ordered packets (up to a threshold amount of data or number of packets, for example).

Figure 10:
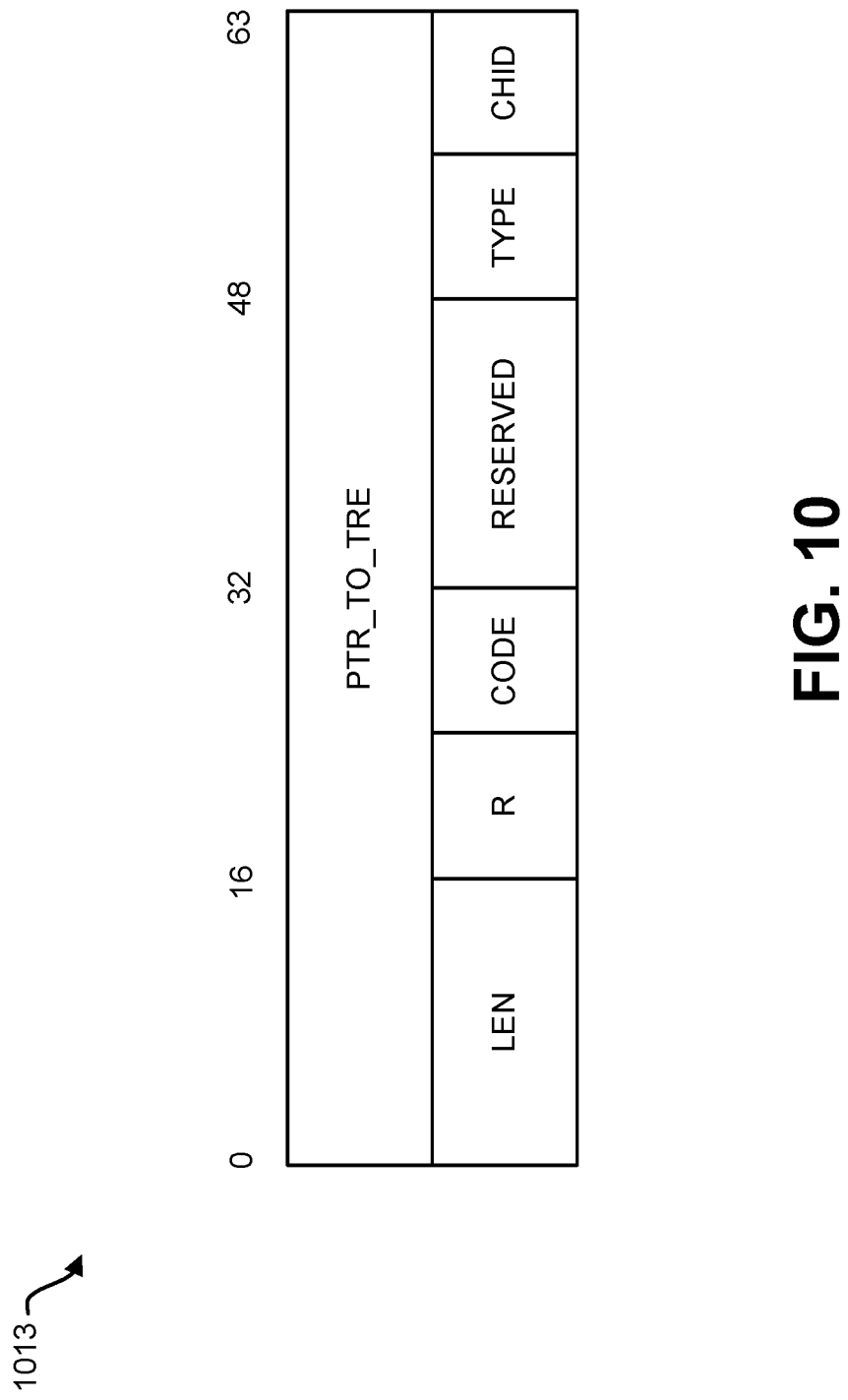
FIG. 10 is an example of a structure for an application processor event ring element.

FIG. 10 is an example of a structure for an application processor (e.g., host) event ring element (ERE) 1013. The application processor ERE may include a pointer to a transfer ring (e.g., PTR_TO_TRE). The application processor ERE may include other fields (e.g., a length field (LEN), reserved fields (R, RESERVED), a code field (CODE), a type field (TYPE), and/or a channel ID (CHID) field). Regarding the CHID field, multiple channels may share a single event ring. The event (ERE) may accordingly indicate the channel indicator or identifier (ID) that the event corresponds to. The PTR_TO_TRE may be a pointer to the transfer descriptor. The transfer descriptor may be posted in the transfer ring and may contain the data buffer address and length (among other things, for example). The type field (TYPE) may indicates a type of transfer (e.g., DATA, COMMAND, etc.). The code field (CODE) may indicate a sub-type (e.g., which type of COMMAND). The length field (LEN) may indicate the length of a completed transfer (e.g., packet length). It should be noted that while FIG. 10 provides one example for a protocol definition, other implementations may use different structures (with generally similar information exchanged, for example).

The application processor ERE 1013 may be an example of an element that may be stored in an application processor event ring in accordance with some configurations of the systems and methods disclosed herein. For example, a set of EREs 1013 may be written to an event ring in an order that specifies an order of packet consumption (relative to a transfer ring, for instance) such that the packets will be consumed in order (even though the packets were received and/or stored out of order, for instance). The numbers above the structure may denote numbers of bits relative to the fields.

Figure 11:
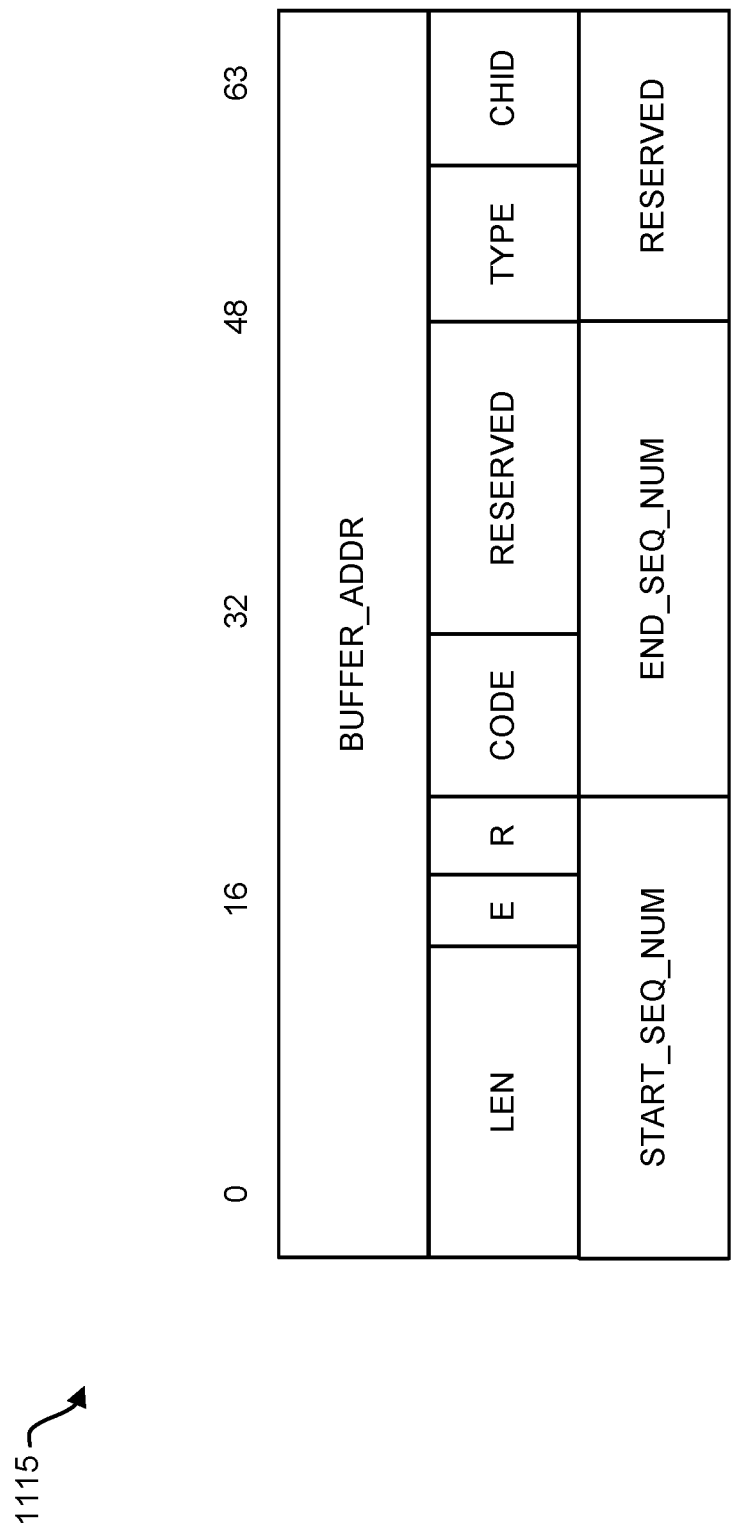
FIG. 11 is an example of a structure for an out of order event ring element that may be implemented and/or utilized in some configurations of the systems and methods disclosed herein.

FIG. 11 is an example of a structure for an out of order event ring element (OOO ERE) 1115 that may be implemented and/or utilized in some configurations of the systems and methods disclosed herein. The OOO ERE 1115 may include a buffer address field (BUFFER_ADDR). The buffer address may indicate an address (e.g., memory address) at which one or more packets are stored. The OOO ERE may include other fields (e.g., a length field (LEN), an end (E) field, reserved fields (R, RESERVED), a code field (CODE), a type field (TYPE), and/or a CHID field). The OOO ERE 1115 may include a starting sequence number field (START_SEQ_NUM) and an ending sequence number (END_SEQ_NUM). The starting sequence number field may indicate the sequence number of the first packet stored (corresponding to the buffer address, for example), and the ending sequence number field may indicate the number of last packet stored. The starting sequence number field may be an example of the "first_sn" value described in connection with FIG. 9, and the ending sequence number field may be an example of the "last_sn" value described in connection with FIG. 9. The numbers above the structure may denote numbers of bits relative to the fields.

Figure 12:
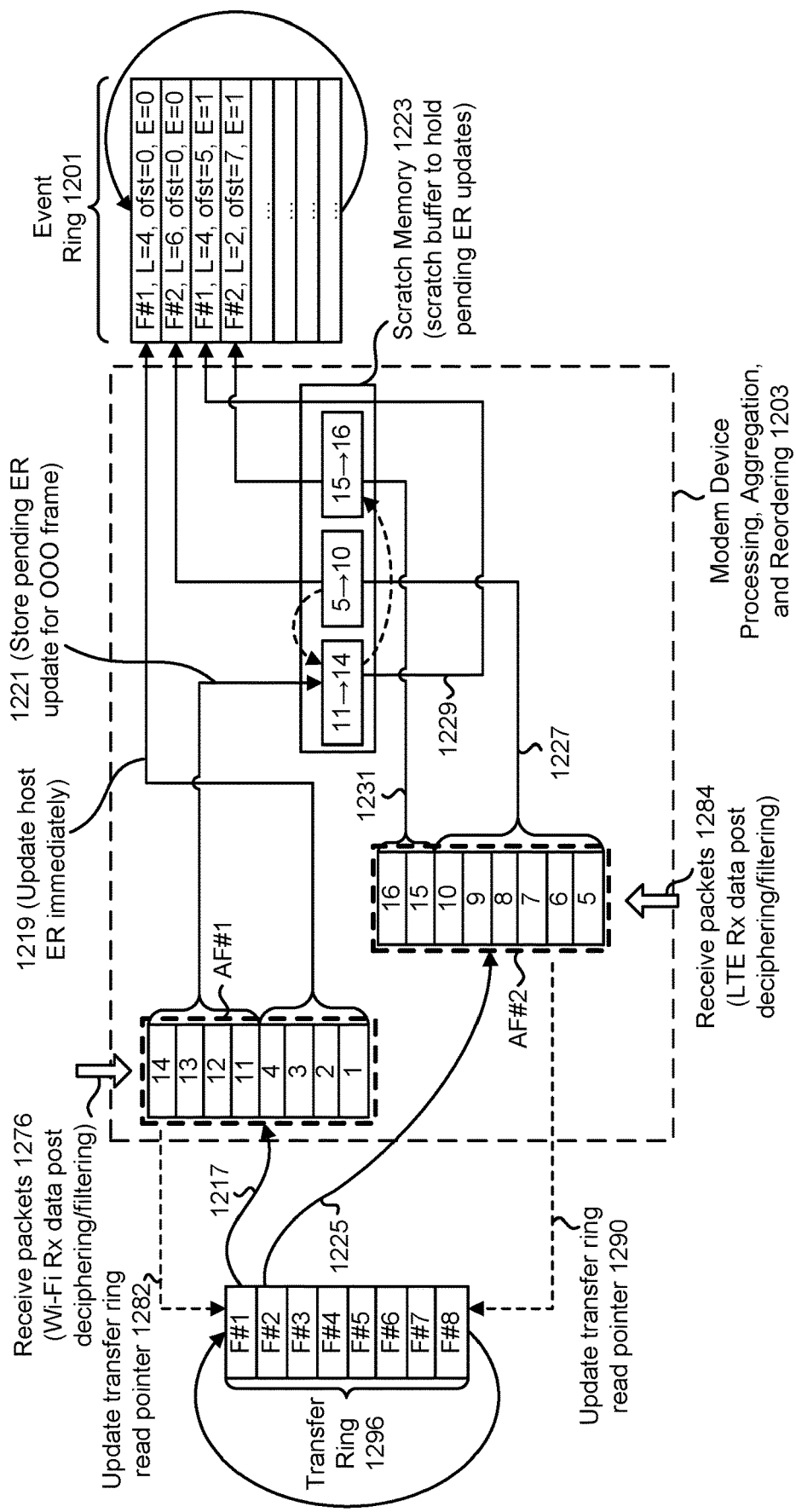
FIG. 12 is a diagram illustrating one example of another approach for reordering data in accordance with the systems and methods disclosed herein.

FIG. 12 is a diagram illustrating one example of another approach for reordering data in accordance with the systems and methods disclosed herein. In particular, FIG. 12 illustrates an example of modem device processing, aggregation, and reordering 1203 (e.g., one or more functions performed by processing, aggregation, and/or reordering logic in the modem device). In the approach described in connection with FIG. 12, aggregation (e.g., data packet aggregation) may be supported. In particular, the approach described in connection with FIG. 12 enables aggregation of data packets (e.g., packets with contiguous and/or non-contiguous sequence numbers). It should be noted that although Wi-Fi and LTE are used as examples of links in this example, one or more other link types may be utilized. This approach may operate in accordance with this example as follows.

A modem device (e.g., modem processor) may receive 1276 packets (e.g., data packets (with sequence numbers) 1-4 and 11-14) over the wireless local area network (WLAN) receiver. The modem device may utilize buffers pointed to in the application processor (e.g., host) transfer ring 1296 to write packets (to application processor memory buffers, for example). The modem device may aggregate 1217 all packets (including out of order (OOO) packets) over the same transmit (Tx) buffer frame 1 (which may be retrieved from the application processor (e.g., host transfer ring (TR)). For example, the packets may be aggregated into aggregated frame 1 (AF#1).

The modem device may maintain an expected sequence number (e.g., PDCP SN). Since the first block in frame 1 matches the expected sequence number, a modified event ring element (ERE) may be updated 1219 in the application processor (e.g., host) event ring 1201. The ERE may include the frame 1 buffer address, an offset=0 (e.g., ofst=0), a length=4*IP packets (e.g., L=4), and an end bit=0 (e.g., E=0). The end bit may indicate whether the packet(s) indicated in the ERE include the last packet in the aggregated frame. An example of a structure (e.g., format) for a modem-host interface event ring element (ERE) is described in connection with FIG. 13. As can be observed, the structure (e.g., format) of the modem-host interface ERE may be changed to accommodate different data as described in connection with FIG. 14.

The modem device may generate (e.g., store) 1221 an outstanding event (OE#1) for the OOO block (for data packets with sequence numbers 11-14). The modem device may store the outstanding event in scratch memory 1223 (e.g., a scratch buffer to hold pending event ring (ER) updates). The scratch memory 1223 (e.g., scratch buffer) may be stored in modem memory and/or in application processor memory. An example of a structure for an outstanding event is described in connection with FIG. 15. Since the transmit buffer frame 1 is fully utilized, the modem device (e.g., interface) may update 1282 the TR read pointer to indicate that the TRE is used.

The modem device may receive 1284 data packets over the LTE receiver. The modem device may aggregate 1225 all packets (including out of order (OOO) packets) over the same transmit (Tx) buffer frame 2 (which may be retrieved from the application processor transfer ring 1296 (e.g., host transfer ring (TR)).

The modem device may generate 1227 an outstanding event (OE#2) (for data packets with sequence numbers 5-10). Since the packets of the outstanding event are in sequence, the modem device (e.g., interface) may update the application processor (e.g., host) event ring 1201. The ERE may include the frame 2 buffer address, an offset=0, a length=6*IP packets, and an end_bit=0.

At this point, the outstanding event (OE#1) is in sequence. Accordingly, the modem device (e.g., interface) may update 1229 the application processor (e.g., host) event ring 1201. The ERE may include the frame 1 buffer address, an offset=4*IP packets (ofst=4), a length=4*IP packets (L=4), and an end bit=1 (E=1). Upon receiving this event, the application processor (e.g., host) may consume data and free the buffer initially specified in frame 1.

The modem device may generate 1231 an outstanding event (OE#3) (for data packets with sequence numbers 15-16) and store the outstanding event in scratch memory 1223. Since these are in sequence, the modem device (e.g., interface) may update the application processor (e.g., host) event ring 1201. The ERE may include the frame 2 buffer address, an offset=6*IP packets, a length=2*IP packets, and an end bit=1. Upon receiving this event, the application processor (e.g., host) may consume data and free the buffer initially specified in frame 2. The modem device may update 1290 the transfer ring read pointer.

Figure 13:
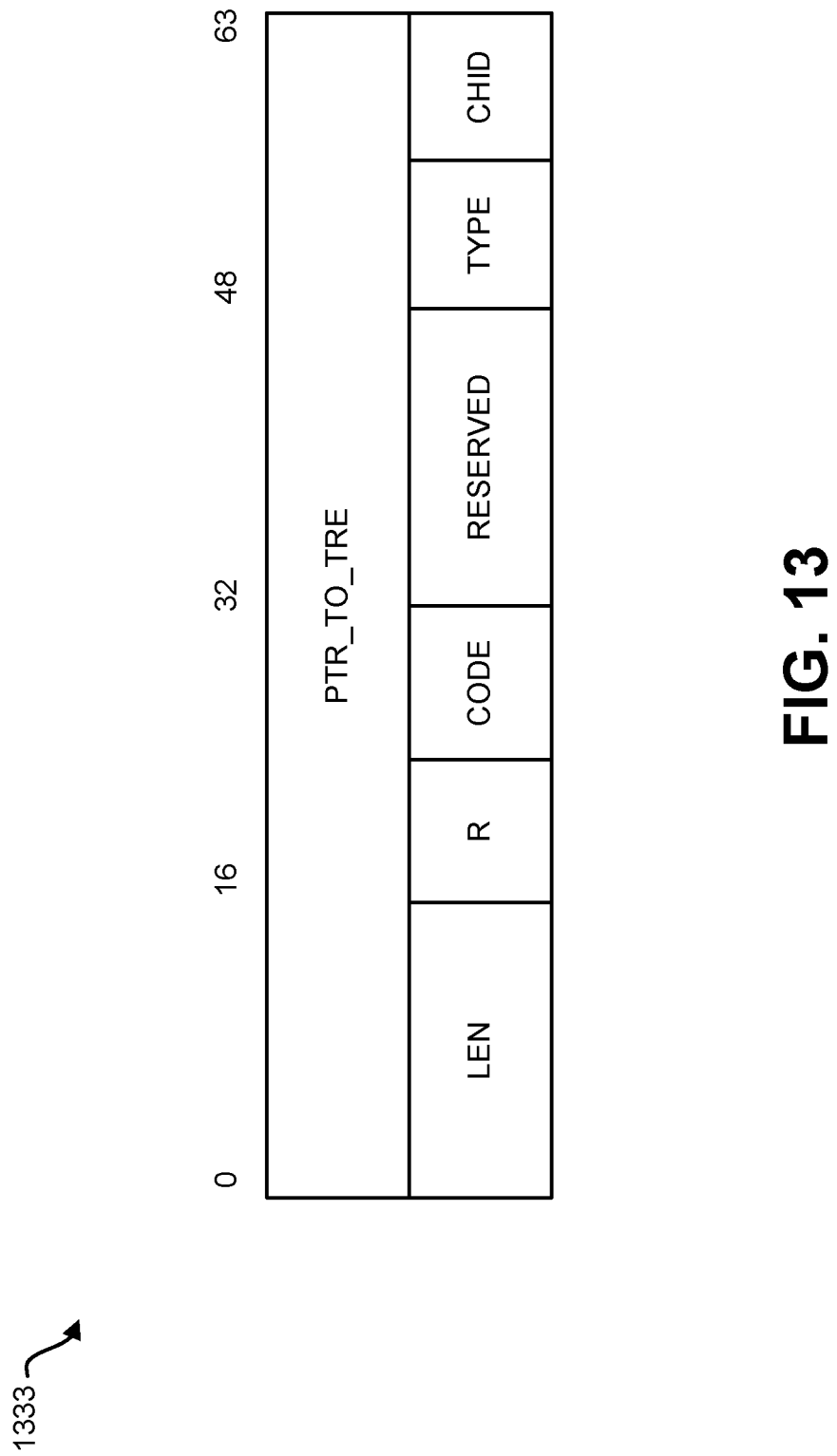
FIG. 13 is an example of a structure for a modem-host interface event ring element.

FIG. 13 is an example of a structure for a modem-host interface event ring element (ERE) 1333. The modem-host interface ERE 1333 may include a pointer to a transfer ring (e.g., PTR_TO_TRE). The modem-host interface ERE 1333 may include other fields (e.g., a length field (LEN), reserved fields (R, RESERVED), a code field (CODE), a type field (TYPE), and/or a channel ID field (CHID)). As can be observed, the structure of the modem-host interface ERE 1333 includes some reserved data. The numbers above the structure may denote numbers of bits relative to the fields.

Figure 14:
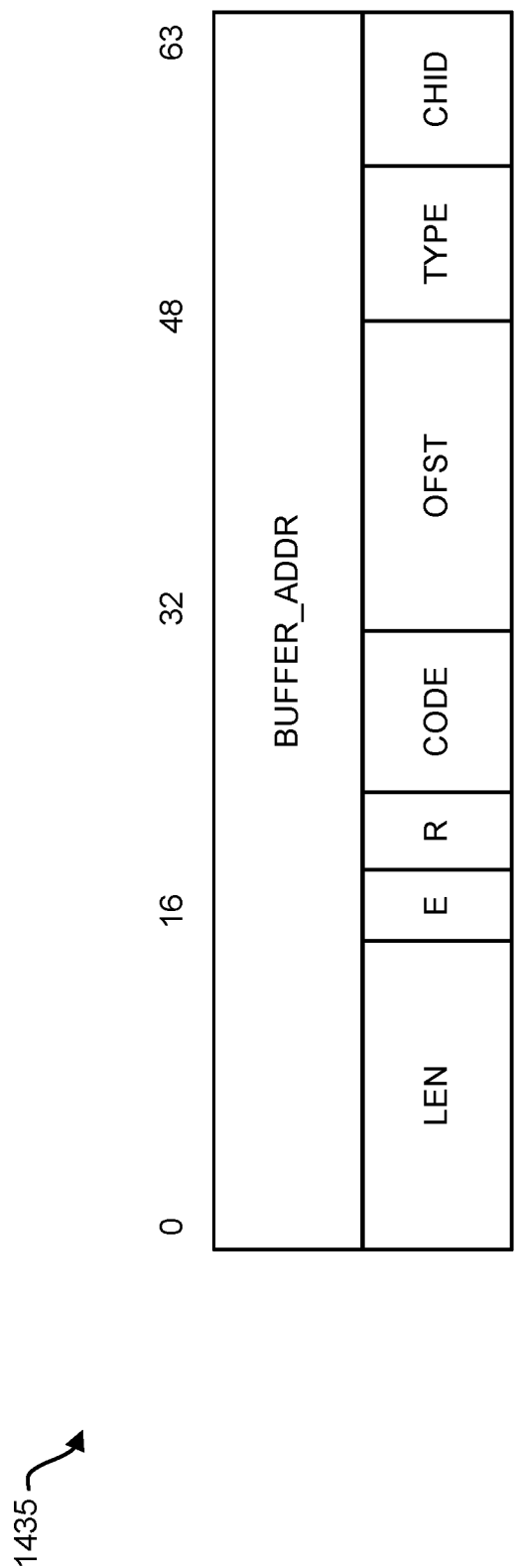
FIG. 14 is an example of another structure for a modem-host interface event ring element.

FIG. 14 is an example of another structure for a modem-host interface event ring element (ERE) 1435. As can be observed, the structure of the modem-host interface ERE 1435 may be different from the structure described in connection with FIG. 13. For example, the structure may be changed to accommodate different data relative to the structure described in connection with FIG. 13. The modem-host interface ERE 1435 may include a buffer address (e.g., BUFFER_ADDR). The modem-host interface ERE 1435 may include other fields (e.g., a length field (LEN), an end field (E), a reserved field (R), a code field (CODE), an offset field (OFST), a type field (TYPE), and/or a channel ID field (CHID)). The modem-host interface ERE 1435 may be an example of an element that may be stored in an application processor event ring in accordance with some configurations (e.g., a configuration described in connection with FIG. 12) of the systems and methods disclosed herein. For example, a set of EREs 1435 may be written to an event ring in an order that specifies an order of packet consumption such that the packets will be consumed in order (even though the packets were received and/or stored out of order, for instance). The numbers above the structure may denote numbers of bits relative to the fields.

Figure 15:
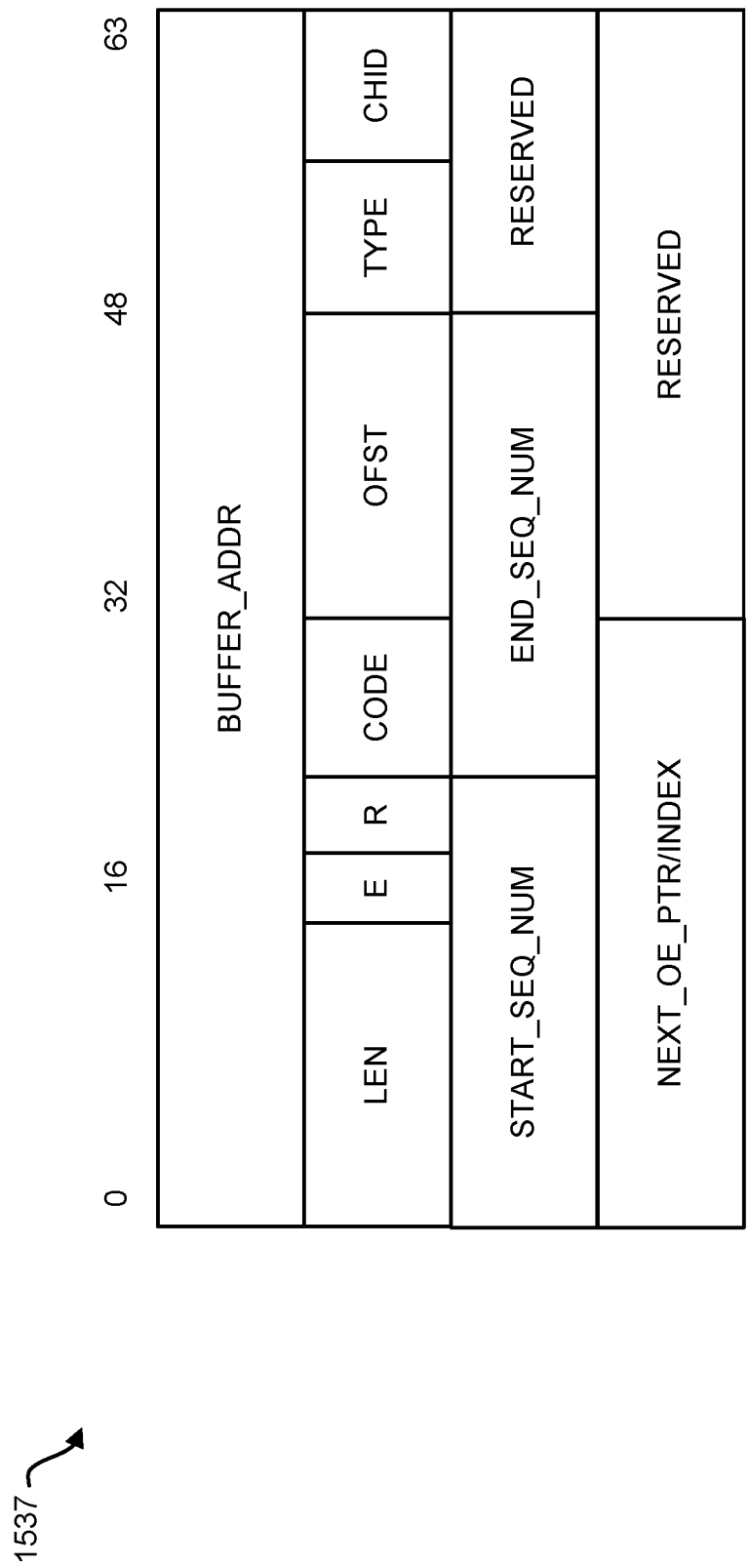
FIG. 15 is an example of a structure for an outstanding event.

FIG. 15 is an example of a structure for an outstanding event (OE). For instance, FIG. 15 illustrates an example of a structure for an outstanding event element 1537 that may be stored in a modem device scratch buffer. The outstanding event element 1537 may include a buffer address (e.g., BUFFER_ADDR). The outstanding event element 1537 may include other fields (e.g., a length field (LEN), an end field (E) (e.g., end indicator), reserved fields (R, RESERVED), a code field (CODE), an offset field (OFST), a type field (TYPE), a channel ID field (CHID), a starting sequence number field (START_SEQ_NUM), an ending sequence number field (END_SEQ_NUM), and/or a next outstanding event pointer or index (NEXT_OE_PTR/INDEX)). The outstanding event element 1537 may be an example of an element that may be stored in a scratch buffer (e.g., a modem device scratch buffer) in accordance with some configurations (e.g., a configuration described in connection with FIG. 12) of the systems and methods disclosed herein. For example, one or more outstanding event elements 1537 may be written to a scratch buffer. Writing the outstanding event element(s) 1537 to the scratch buffer may allow writing event ring element(s) in an order that specifies an order of packet consumption such that the packets will be consumed in order (even though the packets were received and/or stored out of order, for instance). The numbers above the structure may denote numbers of bits relative to the fields.

Figure 16:
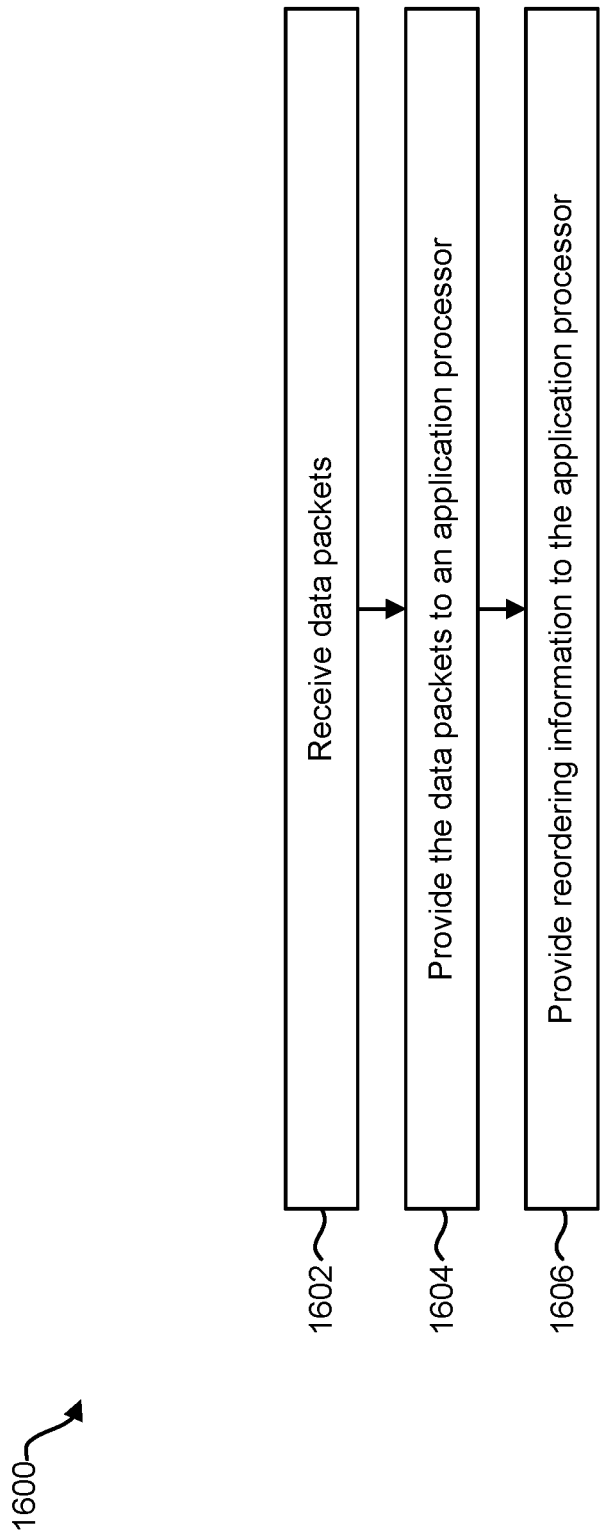
FIG. 16 is a flow diagram illustrating another more specific configuration of a method for reordering data.

FIG. 16 is a flow diagram illustrating another more specific configuration of a method 1600 for reordering data. The method 1600 may be performed by an electronic device 302 (e.g., the electronic device 302 and/or a modem processor 324 described in connection with FIG. 3).

The electronic device 302 (e.g., modem processor 324) may receive 1602 data packets. This may be accomplished as described above in connection with FIG. 3 in some configurations. For example, the modem processor 324 may receive data packets over one or more links (corresponding to one or more RATs, for instance). In some cases, the data packets may be received out of order.

The electronic device 302 (e.g., modem processor 324) may provide 1604 the data packets to an application processor (e.g., application processor 314). This may be accomplished as described in connection with FIG. 3 in some configurations. For example, the modem processor 324 may provide 1604 at least a portion of the data packets (corresponding to one or more links, for instance) to the application processor 314. In some cases, the modem processor 324 may provide 1604 the data packets to the application processor 314 out of order (e.g., in a non-continuous and/or non-contiguous order) to the application processor 314. The application processor 314 may store the data packets in application processor memory (e.g., in application processor memory 328 and/or in one or more application processor buffers 338).

The electronic device 302 (e.g., modem processor 324) may provide 1606 reordering information to the application processor 314. This may be accomplished as described in connection with FIG. 3 in some configurations. For example, the modem processor 324 may provide sequence number(s), bearer indicator(s), and/or link indicator(s) to the application processor 314. The application processor 314 may store and/or provide (e.g., consume, process, utilize, etc.) the data packets based on the reordering information.

Figure 17:
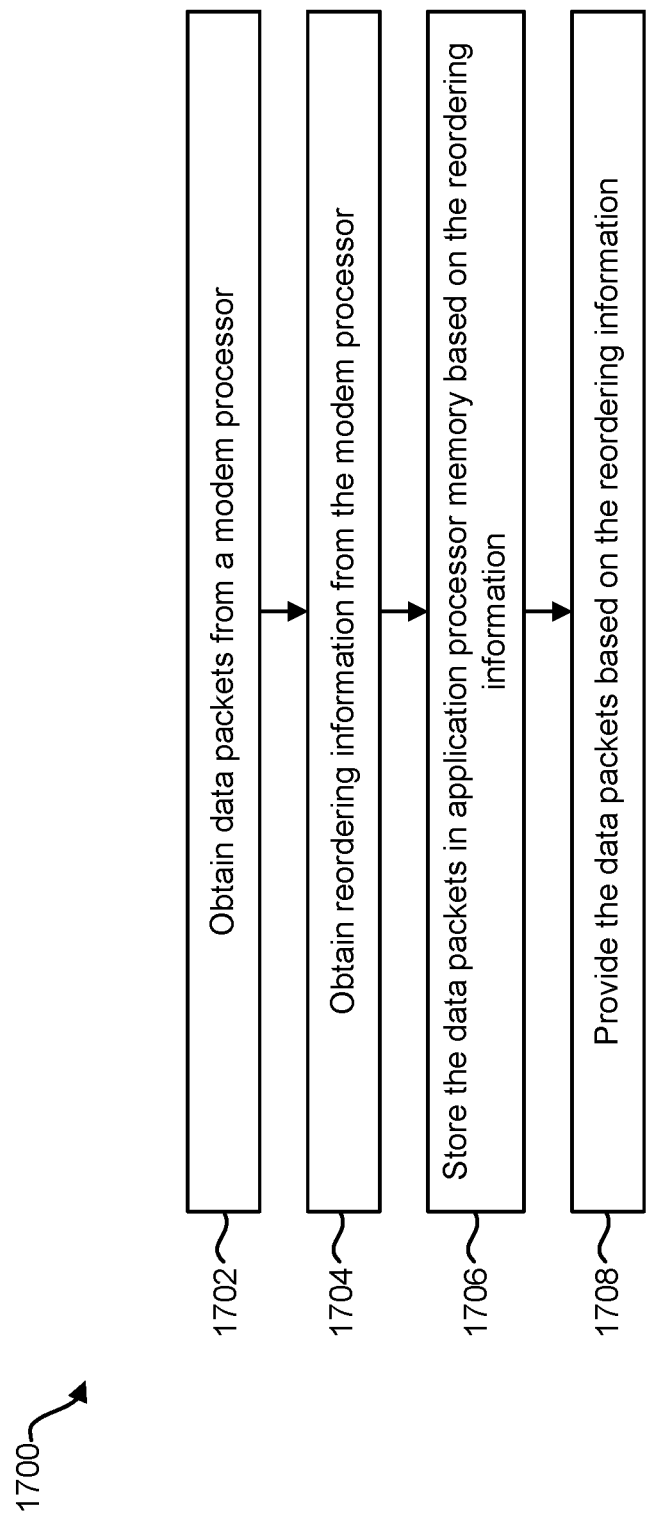
FIG. 17 is a flow diagram illustrating another more specific configuration of a method for reordering data.

FIG. 17 is a flow diagram illustrating another more specific configuration of a method 1700 for reordering data. The method 1700 may be performed by an electronic device (e.g., the electronic device 302 and/or the application processor 314 described in connection with FIG. 3).

The electronic device 302 (e.g., application processor 314) may obtain 1702 data packets from a modem processor 324. This may be accomplished as described in connection with FIG. 3 in some configurations. For example, the application processor 314 may receive data packets out of order from the modem processor 324. The data packets may correspond to one or more links (from one or more RATs, for example).

The electronic device 302 (e.g., application processor 314) may obtain 1704 reordering information from the modem processor 324. This may be accomplished as described in connection with FIG. 3 in some configurations. For example, the application processor may obtain 1704 sequence number(s), bearer indicator(s), and/or link indicator(s) from the modem processor 324.

The electronic device 302 (e.g., application processor 314) may store 1706 the data packets in application processor memory 328 (e.g., in one or more application processor buffers 338) based on the reordering information. This may be accomplished as described in connection with FIG. 3 in some configurations. For example, the application processor 314 may store 1706 one or more sets of data packets in one or more data structures based on the reordering information. Examples of storing 1706 data packets are given in connection with one or more of FIGS. 18-21, and 26.

The electronic device 302 (e.g., application processor 314) may provide 1708 the data packets based on the reordering information. This may be accomplished as described in connection with FIG. 3 in some configurations. For example, the application processor 314 may provide 1708 (e.g., consume, process, utilize, etc.) the data packets in an order indicated by the reordering information. Examples of providing 1708 the data packets are given in connection with one or more of FIGS. 18-21, and 26.

Figure 18:
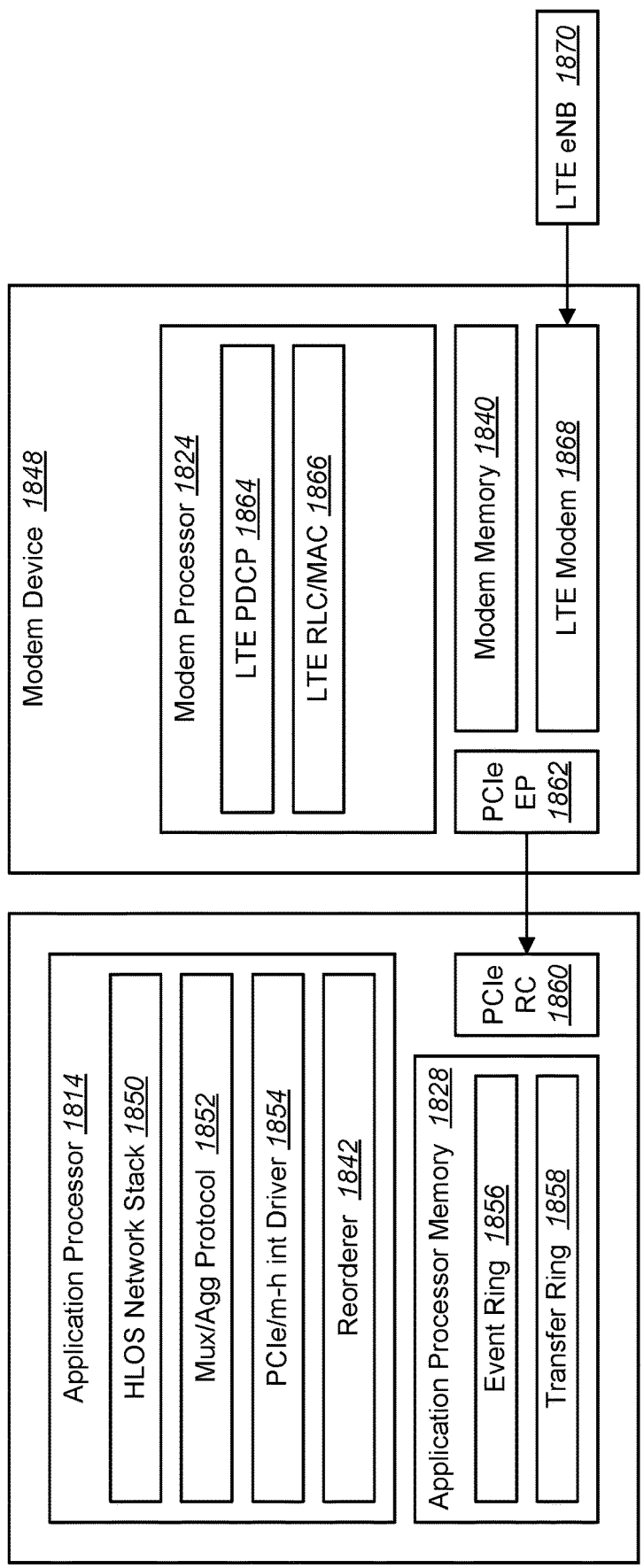
FIG. 18 is a block diagram illustrating another example of an application processor and a modem device.

FIG. 18 is a block diagram illustrating another example of an application processor (AP) 1814 and a modem device 1848 (e.g., MDM). In particular, this example illustrates a data transfer overview with data transfer over a PCIe interconnect (or another interface). The application processor 1814 and modem device 1848 described in connection with FIG. 18 may be examples of corresponding components described in connection with FIG. 3. In some configurations, the application processor 1814 may include and/or implement a reorderer 1842.

In some configurations, the modem processor 1824 may include and/or implement an LTE PDCP layer 1864 and/or an LTE RLC/MAC layer(s) 1866. For example, the modem processor 1824 may perform one or more functions corresponding to the LTE PDCP layer 1864 protocol and/or one or more functions corresponding to the LTE RLC/MAC layer 1866 protocol. In some configurations, the application processor 1814 may include and/or implement a high level operating system (HLOS) network stack 1850, a multiplexing/aggregation (mux/agg) protocol 1852, and/or a PCIe modem-host interface (PCIe/m-h int) driver 1854.

In some configurations, the modem processor 1824 may perform one or more reordering operations in addition to or alternatively from the reorderer 1842. For example, the modem processor 1824 may perform one or more functions in coordination with the application processor 1814 to achieve packet reordering. In some configurations, the modem processor 1824 may bypass one or more modem processor 1824 packet reordering functions. For example, the modem processor 1824 may detect one or more criteria (e.g., a threshold data rate, activation of multi-link communication (e.g., LWA, DC-LTE, etc.) for one or more data streams, etc.) for switching from modem processor-based reordering to application processor-assisted or application processor-based reordering.

In the example illustrated in FIG. 18, the modem device 1848 (e.g., the MDM) may receive data (e.g., data packet(s)) from LTE and/or Wi-Fi (LWA) links. For example, the modem device 1848 (e.g., LTE modem 1868) may receive data from an LTE evolved Node B (eNB) 1870. The data may be deciphered (by the modem device 1848, for example) and moved to application processor memory 1828 (e.g., host memory, memory in an application processor 1814 and/or a tethered device) as specified by the buffers in a destination transfer (Txfr) ring 1858. The data may be moved over a PCIe interface (or other interface. For example, the PCIe endpoint (EP) 1862 may send the data to the PCIe root complex (RC) 1860.

In some approaches, multiple data packets may be aggregated into a single application processor memory buffer (e.g., host buffer). Aggregation parameters may be negotiated at call bring up time between the application processor 1814 (e.g., host) and the modem device 1848.

Completion information about the data transmission in the application processor memory buffers (e.g., host buffers) may be provided in the event (Evnt) ring 1856. After events are written to the event ring 1856, an interrupt may be generated to the application processor 1814 (e.g., host), indicating data transfer completion.

The application processor 714 (e.g., host) may read the events in the event ring 1856 to know about the buffers containing data. The application processor 1814 may consume the buffers in an order based on the reordering information from the modem device 1848.

While some of the configurations described herein may utilize an event ring, it should be noted that other configurations may not include and/or may not rely on an event ring. In other words, the event ring may be used for completion in some specific implementations. Some configurations may more generally utilize application processor 1814 (e.g., host) transfer buffers which may or may not include event rings. Accordingly, the systems and methods disclosed herein may apply to a variety of implementations for completion notification of transfer buffers to an application processor 1814 (e.g., host), which may or may not use event rings. Accordingly, some configurations that are described in terms of event rings may be alternatively implemented in transfer buffers without event rings. In some configurations, the modem device 1848 (e.g., MDM) may optionally include one or more processors.

Figure 19:
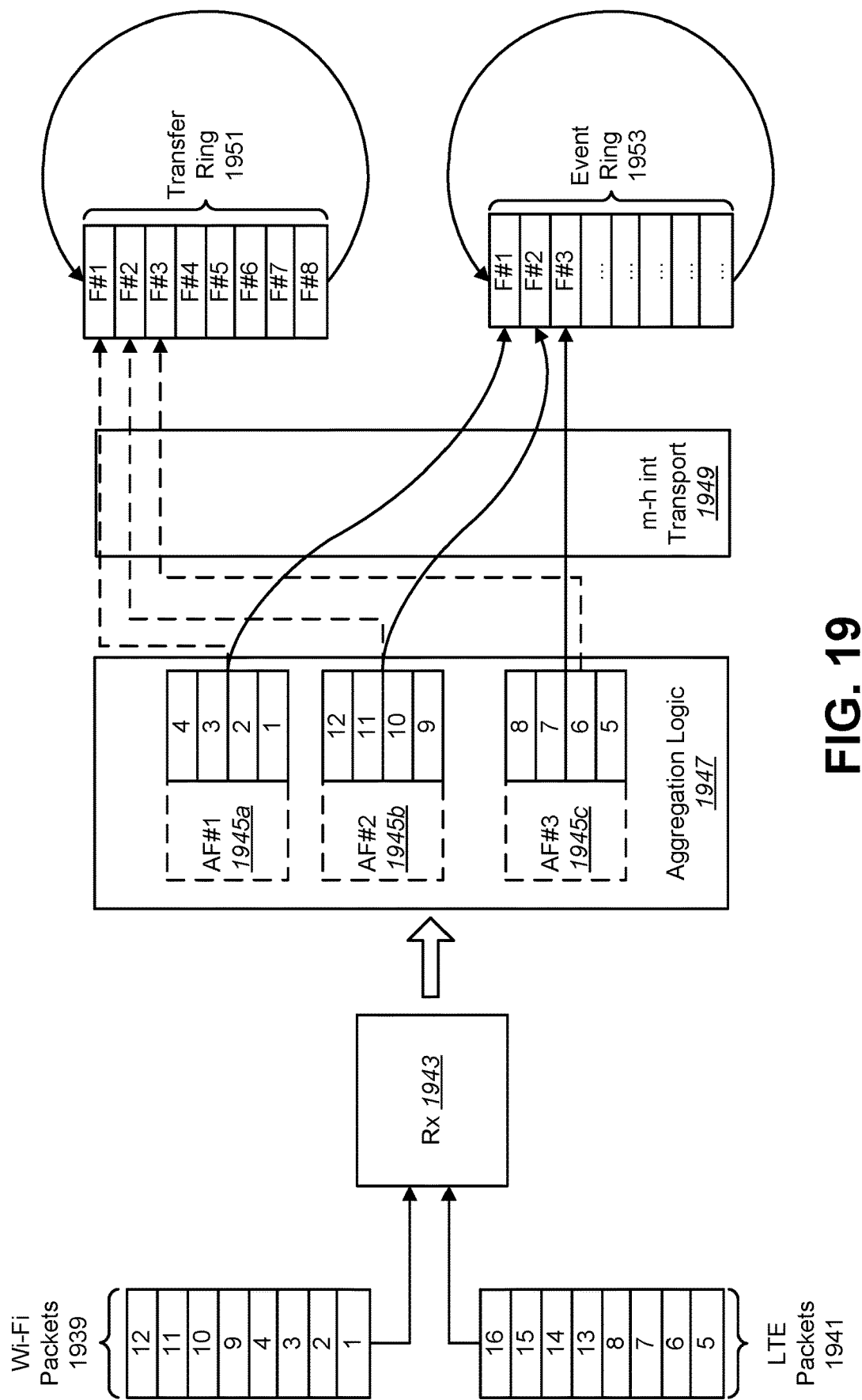
FIG. 19 is a diagram illustrating one example of an architecture for data packet transfer.

FIG. 19 is a diagram illustrating one example of an architecture for data packet transfer. One or more aspects of the architecture may be implemented in some configurations of the systems and methods disclosed herein. One or more of the elements described in connection with FIG. 19 may be implemented on an electronic device (e.g., electronic device 302). FIG. 19 illustrates an example of a set of Wi-Fi data packets 1939 and a set of LTE data packets 1941 with corresponding sequence numbers. It should be noted that although Wi-Fi and LTE are used as examples of links in this example, one or more other link types (e.g., packets from one or more other link types) may be utilized.

As illustrated in FIG. 19, the Wi-Fi packets 1939 and LTE packets 1941 may be received by a receiver 1943 (e.g. a receiver on an electronic device 302). The receiver 1943 may receive and/or decipher the Wi-Fi data packets 1939 and the LTE data packets 1941. The Wi-Fi data packets 1939 and the LTE data packets 1941 may be provided to aggregation logic 1947. In some configurations, the aggregation logic 1947 may be implemented on a modem device (e.g., on a modem processor 324). The aggregation logic 1947 may aggregate (e.g., group) sets of packets. For example, the aggregation logic 1947 may aggregate the Wi-Fi data packets 1939 and the LTE data packets 1941 into aggregation frame 1 (AF#1) 1945*a*, AF#2 1945*b*, and AF#3 1945*c*. The aggregation frames 1945*a-c* may be mapped to frames (e.g., F#1, F#2, and F#3) in an application processor (e.g., host) transfer ring 1951 and an application processor (e.g., host) event ring 1953 via the m-h int transport 1949.

Figure 20:
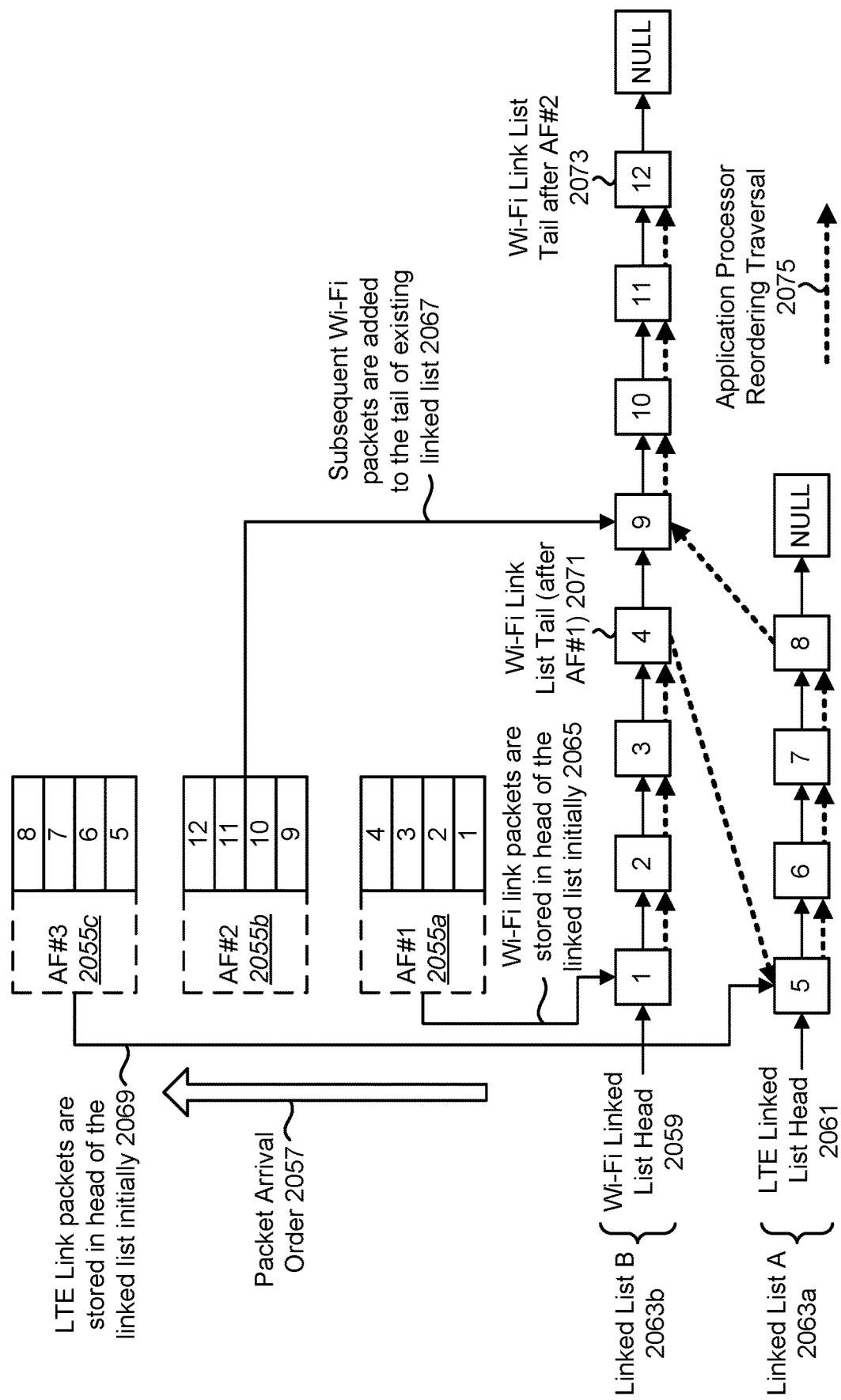
FIG. 20 is a diagram illustrating another example of an approach for reordering data in accordance with some configurations of the systems and methods disclosed herein.

FIG. 20 is a diagram illustrating another example of an approach for reordering data in accordance with some configurations of the systems and methods disclosed herein. One or more of the functions described in connection with FIG. 20 may be implemented on and/or performed by the electronic device 302 described in connection with FIG. 3. The approach illustrated in FIG. 20 may be a linked list approach. One or more linked lists may be utilized to reorder out of order packets. In particular, FIG. 20 illustrates linked list A 2063*a* for a first link (e.g., an LTE link) and linked list B 2063*b* for a second link (e.g., a Wi-Fi link). It should be noted that although Wi-Fi and LTE are used as examples of links in this example, one or more other link types may be utilized. This approach may operate in accordance with the following example.

In this approach, a modem device (e.g., a modem processor 324) may reorder data packets received on a single link but not across links. Ordered packets in a single link may be out of order (between links) at the PDCP layer (for LWA/DC, for example). In FIG. 20, the data packets between links are illustrated as OOO data packets between the LTE and Wi-Fi links. The modem device (e.g., modem processor 324) may send one or more of the following reordering information with every data packet transmitted to the application processor (e.g., host): link indicator (e.g., link ID), bearer indicator (e.g., bearer ID), and/or sequence number.

The application processor (e.g., host) may maintain two linked lists (e.g., two or more, two linked lists at most, etc., in some configurations) per bearer for respective links on which the data packets are received. Different combinations of links are possible. LTE and Wi-Fi may be two links in LWA, for example. A first LTE link (e.g., LTE1) and a second LTE link (e.g., LTE2) may be two links in DC, for example.

In the example illustrated in FIG. 20, a packet arrival order 2057 (at the application processor or host, for example) is shown. For instance, packets 1-4 (e.g., aggregated frame 1 (AF#1) 2055*a*) from a Wi-Fi link may arrive first, followed by packets 9-12 (e.g., AF#2 2055*b*) from the Wi-Fi link, followed by packets 5-8 (e.g., AF#3 2055*c*) from an LTE link. In this example, the application processor (e.g., application processor 314) may store 2065 Wi-Fi link packets 1-4 at the Wi-Fi linked list head 2059 initially. The linked list tail 2071 in linked list B 2063*b* (after storing AF#1 2055*a*) is illustrated.

The application processor (e.g., application processor 314, host, etc.) may add received packets to the tail of individual lists per link. For example, the application processor may add 2067 subsequent Wi-Fi packets 9-12 to the tail of linked list B 2063*b* (for the Wi-Fi link). The linked list tail 2073 in linked list B 2063*b* (after storing AF#2 2055*b*) is illustrated. It should be noted that the application processor (e.g., host) may not need to traverse over the lists to determine the insertion point. This may have a complexity of O(1).

The application processor (e.g., application processor 314) may add 2069 LTE link packets 5-8 at the LTE linked list head 2061 of linked list A 2063*a* initially. As illustrated in FIG. 20, application processor reordering traversal 2075 (e.g., reorderer 342*b*, host MAP driver REO traversal logic, etc.) may traverse the linked lists 2063*a-b* to reorder the packets into correct order. For example, the application processor (e.g., application processor 314) may consume packets in the correct order based on the linked list traversal.

In some configurations, the application processor (e.g., host) may only process packets in consecutive order. For example, the application processor may not assume packets are in order within a link. The following may be an enhancement to avoid running a reordering timer when it is known or can be assumed with a high probability that packets will always be in order on a given link.

The application processor may provide (e.g., consume, process, utilize, etc.) data as long as it is ordered and/or has an expected sequence number. In the event that there is a hole and both links have packets of with a higher sequence number (SN) than expected, the application processor (e.g., host) may keep consuming data from the available lowest sequence number onwards. In the event that there is a hole and one of the links does not have any packets and the other link has a higher than expected sequence number, the application processor (e.g., host) may wait for packet arrival on the empty link (for a threshold amount of time, until timing out, for example, etc.).

In some configurations, the modem device (e.g., modem processor) may notify the application processor (e.g., host) when to start buffering and when to flush all OOO data up to a specific sequence number. Some conditions for sending flush commands to the application processor (e.g., host) may be implemented as follows. A flush command may be sent when running out of application processor memory (e.g., allocated space and/or usable memory). In some approaches, the application processor may send a buffering space indicator to the modem (e.g., modem processor). For example, the application processor may notify the modem (e.g., modem processor) that the application processor has space for n buffers. The modem (e.g., modem processor) may then send a flush command when the modem determines that a certain number of OOO packets have been sent to the application processor. In some cases, certain packets may get consumed at the modem. This could cause the application processor (e.g., host) to detect these as missing packets and run reordering timers, unnecessarily waiting for a packet that will never arrive. In some configurations, the modem device (e.g., modem processor 324) may send a flush command (to the application processor 314, for example) upon consuming packet(s) to avoid the application processor from waiting for these packets. In some configurations, the modem (e.g., modem processor 324) may send a flush command when packets were received on multiple (e.g., both) links and enough packets are received on each link to make an early determination that certain packet(s) will not arrive with a high probability (given that most packets would arrive in order on a given link).

In some configurations, the application processor (e.g., host) may only perform reordering and/or sequencing when the modem device instructs. Otherwise, the application processor (e.g., host) may treat all received data as ordered data (such as in a single LTE DL scenario, for example).

In some configurations, the reordering information (e.g., packet metadata) may contain information about the link on which it is received (e.g., LTE1, LTE2, Wi-Fi, etc.). The application processor (e.g., application processor 314, host, etc.) may maintain a linked list per receive (Rx) link for a single bearer. In some configurations, one or more sets of links for one or more bearers may be utilized.

Some configurations of the systems and methods disclosed herein may provide reduced complexity of ordering packets on the application processor (e.g., host). For example, best case complexity may be O(1). In this case, the application processor (e.g., host) may not need to walk through each list and/or table upon receiving new packets. Packets received on either link may be added to the tail of list maintained per link. Worst case complexity may be O(n). For example, the application processor (e.g., host) may need to determine the insertion point for each packet received by walking through each list.

In a best case scenario, if a hole is encountered in sequence number, but higher sequence numbers are seen on both links, then the application processor (e.g., host) may assume that either the packet is filtered back to the modem or is not sent by the network (NW). The application processor (e.g., host) may choose to continue with application processor reordering logic in this case without any modem device (e.g., modem processor) intervention.

Figure 21:
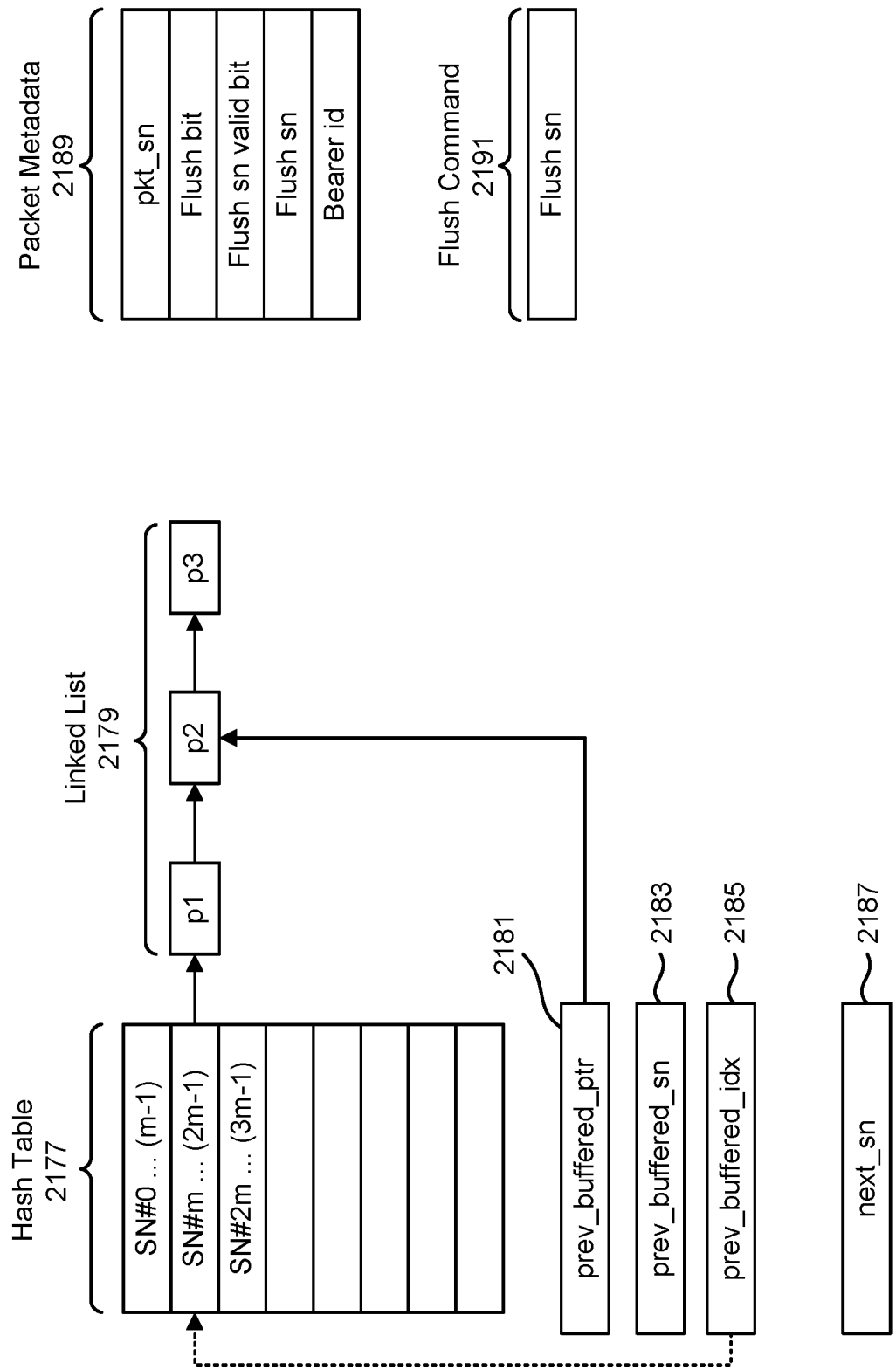
FIG. 21 is an example of another approach for reordering data in accordance with some configurations of the systems and methods disclosed herein.

FIG. 21 is an example of another approach for reordering data in accordance with some configurations of the systems and methods disclosed herein. In particular, FIG. 21 illustrates an example of a hash table approach. The hash table approach may offer a reduced memory impact on the application processor (e.g., host) memory. This approach may operate in accordance with the following example. An application processor (e.g., application processor 314) and/or a modem device (e.g., modem processor 324) may perform one or more of the operations described in connection with FIG. 21 in order to store, buffer, reorder, and/or flush packets.

In some configurations, packet metadata 2189 may be utilized to store, buffer, reorder, and/or flush packets. In some examples, packet metadata 2189 may include a sequence number (e.g., pkt_sn, SN, etc.), a flush bit, a flush sequence number valid bit (flush sn valid bit), a flush sequence number (flush sn), and/or a bearer ID (bearer id). In this example, the data packets may be organized as a hash table 2177. The packet metadata 2189 and/or packet data of one or more packets may be stored in the hash table 2177.

The hash table 2177 may be indexed using sequence numbers (e.g., SN#0, SN#1, SN#2, etc.). In some configurations, each slot may store up to m consecutive packets (e.g., p1, p2, p3, etc.) in a linked list (e.g., linked list 2179). This may reduce the memory requirement.

Packets may be efficiently added to the reorder buffer by caching a pointer (e.g., a previous buffered pointer, "prev_buffered_ptr 2181," etc.). A pointer may be cached, since packets may arrive in relative order, for example. Out of order packets that do not need to be buffered may not incur the cost of linked list traversal to store in the buffer. Out of order packets (e.g., packets that are not in relative sequence) that cannot be flushed may incur the cost of linked list traversal to store the packets in order.

As illustrated in FIG. 21, some examples of data structures in accordance with some configurations of the systems and methods disclosed herein may include and/or utilize a previous buffered pointer (e.g., prev_buffered_ptr 2181), a previous buffered sequence number (e.g., prev_buffered_sn 2183), a pervious buffered index (e.g., prev_buffered_idx 2185), and/or a next sequence number (e.g., next_sn 2187).

As follows, Listing (1) includes a pseudo code that may be implemented in accordance with some configurations of the systems and methods disclosed herein. An application processor (e.g., application processor 314) and/or a modem device (e.g., modem processor 324) may perform one or more of the operations described in connection with Listing (1) in order to store, buffer, reorder, flush packets, and/or manage packets. In order to flush one or more packets, a flush command 2191 (e.g., flush cmd) may be provided. For example, a modem device (e.g., modem processor 324) may send the flush command 2191 to the application processor (e.g., application processor 314).

---

Listing (1)

---

If packet has flush bit set /* flush packet and reorder buffer */
   Flush all buffered packets (in order) from next_sn to pkt_sn-1
   Send current packet without buffering
   If packet has flush_sn_valid bit set
     Flush all buffered packets (in order) from pkt_sn+1 to flush_sn
   next_sn = sn of last packet sent+1
   prev_buffered_ptr = NULL
Else /* add packet to reorder buffer */
   Calculate index using pkt_sn
   If ((prev_buffered_ptr) && (prev_buffered_sn < pkt_sn) && (prev_buffered_index == pkt_index))
     Start from prev_buffered_ptr and stash the packet at the appropriate position in the chain to maintain list ordering
   Else
     Start from head of the chain, stashing packet in the chain to maintain list ordering
   Update prev_buffered_ptr, prev_buffered_sn, prev_buffered_idx

---

In Listing (1), prev_buffered_ptr is a pointer to the last packet added to the reorder buffer, prev_buffered_sn is a sequence number of the last packet added to the reorder buffer, prev_buffered_idx is an index into a hash table of the last packet added to reorder buffer, next_sn is a next expected sequence number, pkt_sn is a sequence number (e.g., SN) of a packet, flush bit is a bit in a packet header indicating whether a packet can be immediately delivered without buffering (in order of SNs, for example), flush_sn_valid_bit is a bit in a packet header indicating whether the packet carries a valid flush sequence number, and/or flush_sn is a sequence number up to which packets can be delivered immediately.

One advantage to the approach described in connection with FIG. 21 may include a reduced memory requirement at the application processor (e.g., host) for worst case reordering. Another advantage may be a reduced cost of link traversal when there are numerous OOO packets. Another advantage may be that link information in packet metadata may not be mandatory. Accordingly, the application processor (e.g., host) may remain unaware of the receive (Rx) link on which the packet was received. It should be noted that the application processor (e.g., host) may apply any data structure and/or logic to store the OOO packets such as hash tables, min/max heaps, red-black trees, etc.

Figure 22:
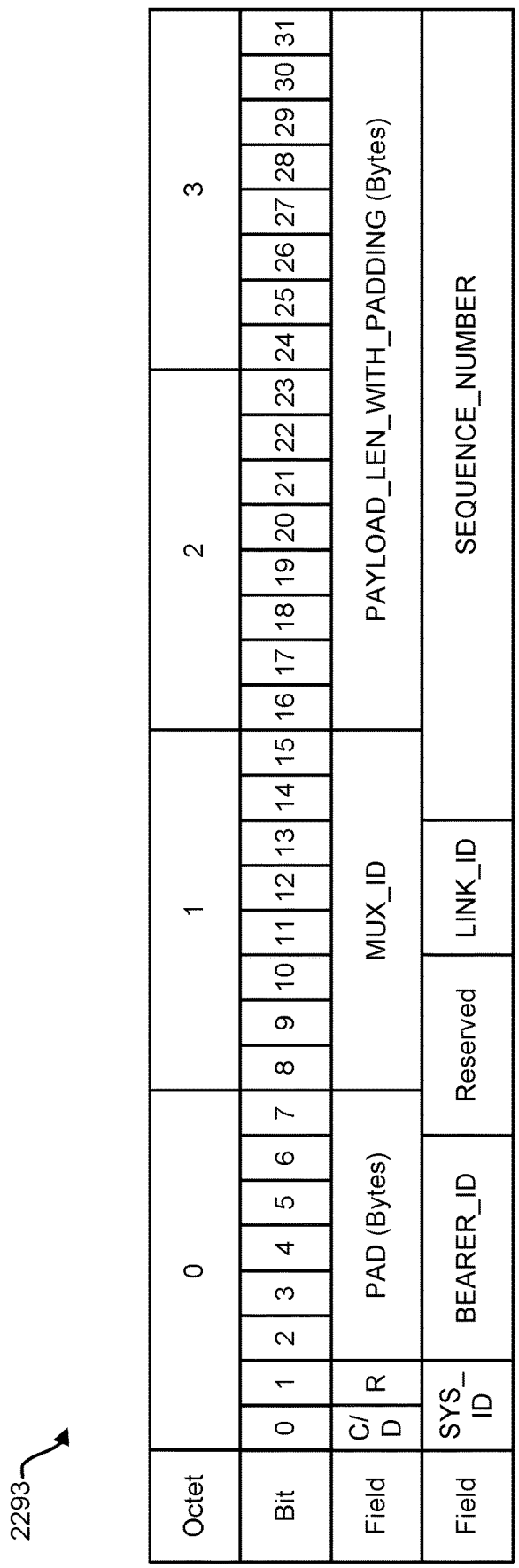
FIG. 22 is an example of a data format that may be utilized in accordance with some configurations of the systems and methods disclosed herein.

FIG. 22 is an example of a data format 2293 that may be utilized in accordance with some configurations of the systems and methods disclosed herein. In particular, FIG. 22 illustrates an example of a multiplexing and aggregation protocol (MAP) data format. For example, some configurations of the systems and methods disclosed herein may operate in accordance with a multiplexing and aggregation protocol. As illustrated in FIG. 22, the data format 2293 may include a C/D field, reserved fields (e.g., R, Reserved), a padding field (PAD) field, a multiplexing ID field (MUX_ID), a payload length with padding field (PAYLOAD_LEN_WITH_PADDING), a system ID field (SYS_ID), a bearer ID field (BEARER_ID), a link ID field (LINK_ID), and a sequence number field (SEQUEN- CE_NUMBER). The C/D field may include one bit indicating whether a packet contains command or data. The PAD field may indicate a number of padding bytes in the packet. The MUX_ID field may indicate one of multiple streams multiplexed on the same transport channel. The payload length with padding field may indicate a packet payload length, including padding. The bearer ID field may indicate a bearer (e.g., data stream). The link ID field may indicate or identify a link (e.g., LTE, Wi-Fi, WLAN, etc.) The sequence number field may indicate a packet sequence number (e.g., a bearer-specific PDCP sequence number) corresponding to the packet. It should be noted that in a L+L (e.g., DC-LTE) case, the bearer ID itself may not be unique, but the system ID field in combination with the bearer ID field may be unique. Alternatively, the multiplexing ID field in combination with the bearer ID field may be unique. In some approaches, the application processor (e.g., host) may treat the two fields (system ID field and bearer ID field) as a single radio bearer ID (RB-ID) field.

Figure 23:
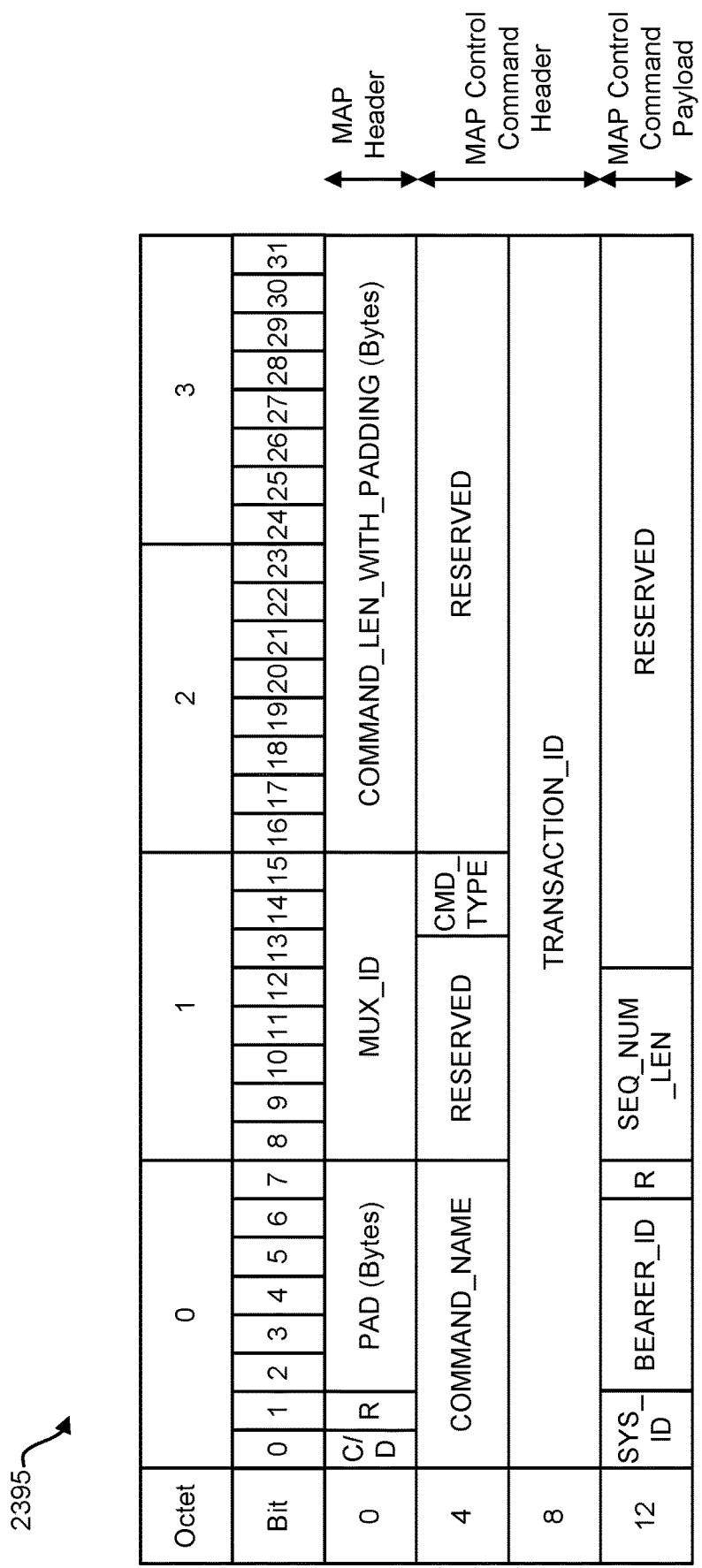
FIG. 23 is a diagram illustrating one example of a start buffer mode command.

FIG. 23 is a diagram illustrating one example of a start buffer mode command 2395. In particular, FIG. 23 illustrates one example of a MAP start buffer mode command. In some configurations, a modem device (e.g., modem processor) may send the start buffer mode command to an application processor to instruct the application processor to begin buffering data. One or more of the fields described in connection with FIG. 23 may be similar to one or more corresponding fields described in connection with FIG. 22.

As illustrated in FIG. 23, the start mode command 2295 may include a C/D field, reserved fields (e.g., R, RESERVED), a padding field (PAD) field, a multiplexing ID field (MUX_ID), a command length with padding field (COMMAND_LEN_WITH_PADDING), a command name field (COMMAND_NAME), a command type field (CMD_TYPE), a transaction ID field (TRANSACTION_ID), a system ID field (SYS_ID), a bearer ID field (BEARER_ID), and a sequence number length field (SEQ_NUM_LEN). The PAD field may indicate a number of padding bytes in the command The command length with padding field may indicate a command length, including padding. The command name field may indicate a name of the command The command type field may indicate a type of the command The transaction ID field may indicate and/or identify a transaction. The sequence number length field may indicate a length of a sequence number. The command name and/or command type fields may indicate a start buffer mode command For example, an application processor may start buffering upon receiving a start buffer mode command from a modem device.

Figure 24:
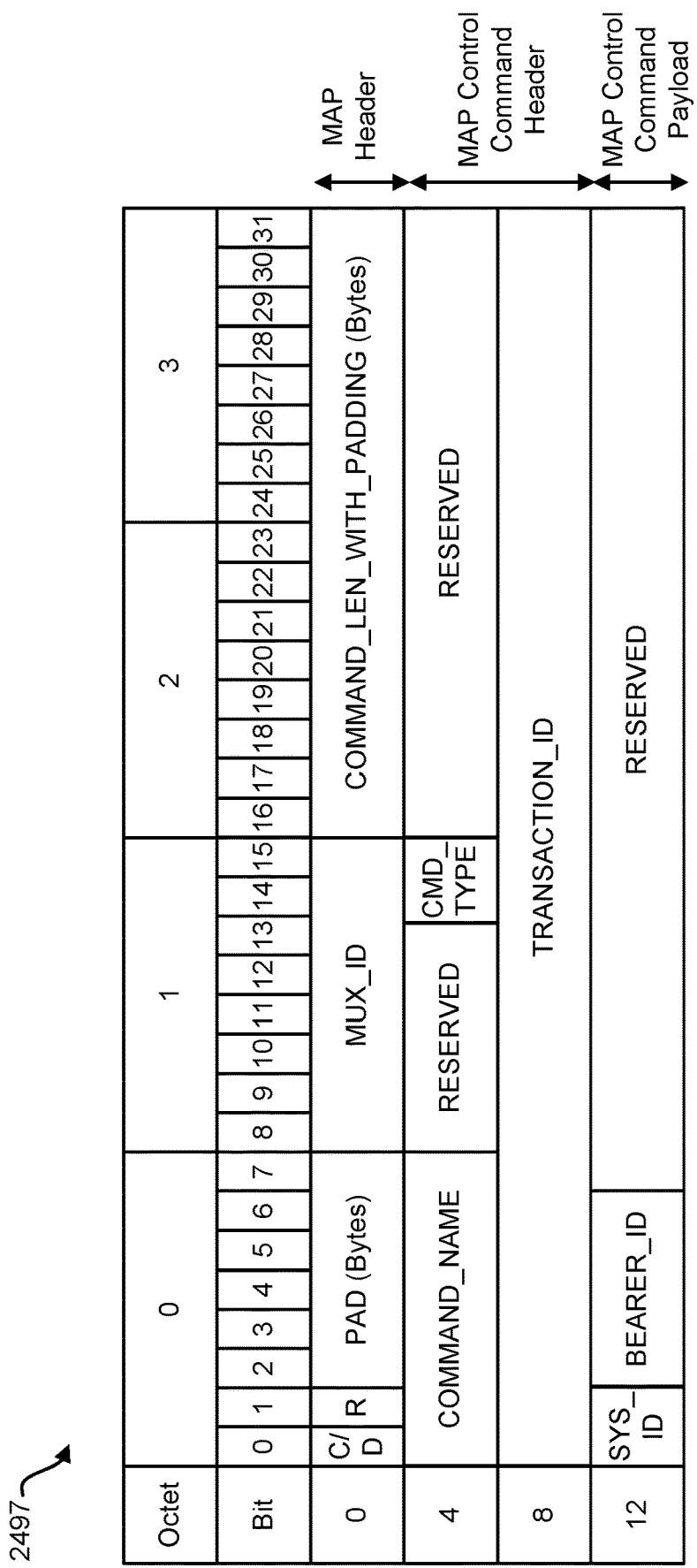
FIG. 24 is an example of a stop buffer mode command.

FIG. 24 is an example of a stop buffer mode command 2497. In particular, FIG. 24 illustrates one example of a MAP stop buffer mode command. In some configurations, a modem device (e.g., modem processor) may send the stop buffer mode command to an application processor to instruct the application processor to stop buffering data. One or more of the fields described in connection with FIG. 24 may be similar to one or more corresponding fields described in connection with one or more of FIGS. 22-23.

As illustrated in FIG. 24, the stop mode command 2497 may include a C/D field, reserved fields (e.g., R, RESERVED), a padding field (PAD) field, a multiplexing ID field (MUX_ID), a command length with padding field (COMMAND_LEN_WITH_PADDING), a command name field (COMMAND_NAME), a command type field (CMD_TYPE), a transaction ID field (TRANSACTION_ID), a system ID field (SYS_ID), and a bearer ID field (BEARER_ID). The command name and/or command type fields may indicate a stop buffer mode command. For example, an application processor may stop buffering upon receiving a stop buffer mode command from a modem device.

Figure 25:
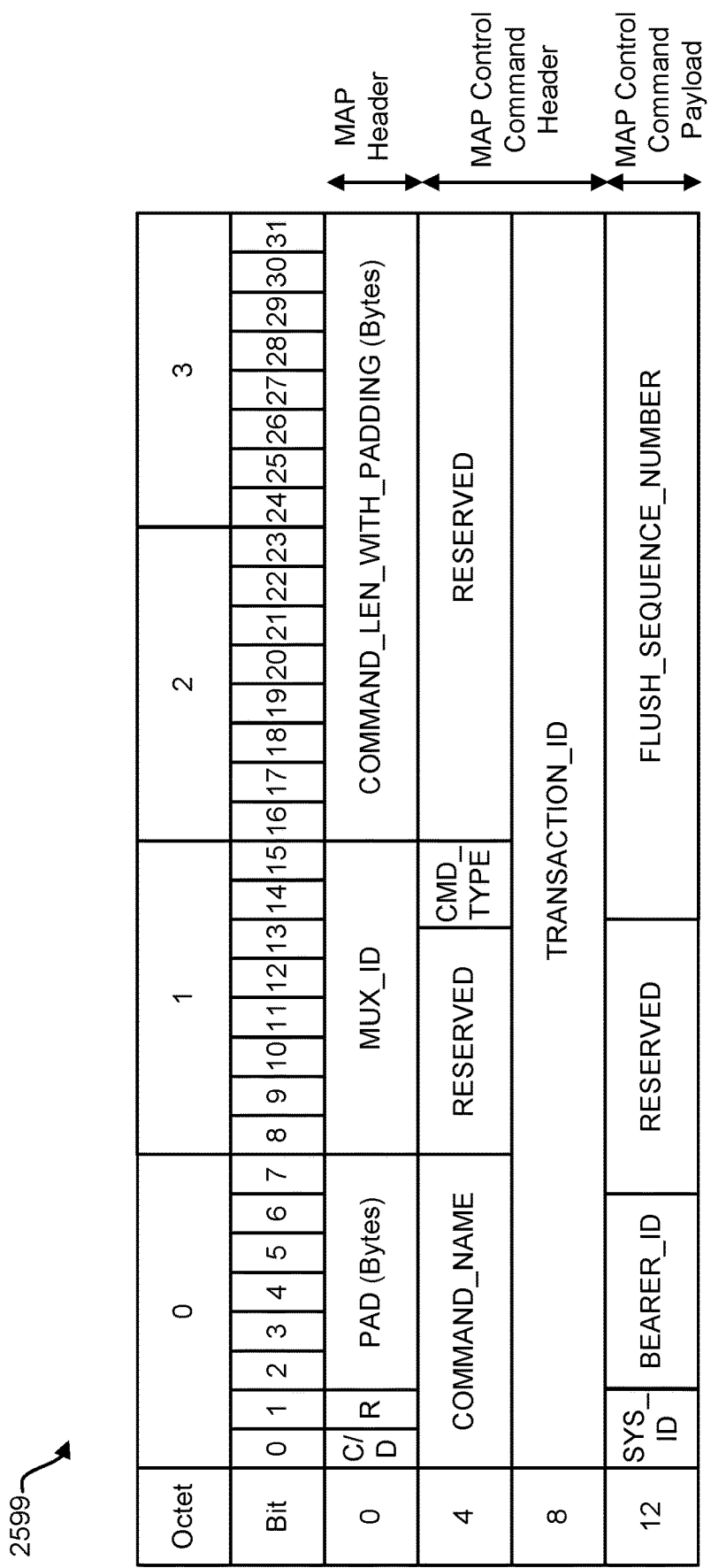
FIG. 25 is an example of a flush command.

FIG. 25 is an example of a flush command 2599. In particular, FIG. 25 illustrates one example of a MAP flush command In some configurations, a modem device (e.g., modem processor) may send the flush command to an application processor to instruct the application processor to flush data. It should be noted that the commands described herein (e.g., start buffer mode command, stop buffer mode command, and/or flush command) may be in band and/or out of band commands One or more of the fields described in connection with FIG. 25 may be similar to one or more corresponding fields described in connection with one or more of FIGS. 22-24.

As illustrated in FIG. 25, the flush command 2599 may include a C/D field, reserved fields (e.g., R, RESERVED), a padding field (PAD) field, a multiplexing ID field (MUX_ID), a command length with padding field (COMMAND_LEN_WITH_PADDING), a command name field (COMMAND_NAME), a command type field (CMD_TYPE), a transaction ID field (TRANSACTION_ID), a system ID field (SYS_ID), a bearer ID field (BEARER_ID), and a flush sequence number field (FLUSH_SEQUENCE_NUMBER). The flush sequence number may indicate a sequence number (e.g., packet sequence number) for flushing. The command name and/or command type fields may indicate a flush command For example, an application processor may flush one or more packets (relative to a sequence number, for example) upon receiving a flush command from a modem device.

Figure 26:
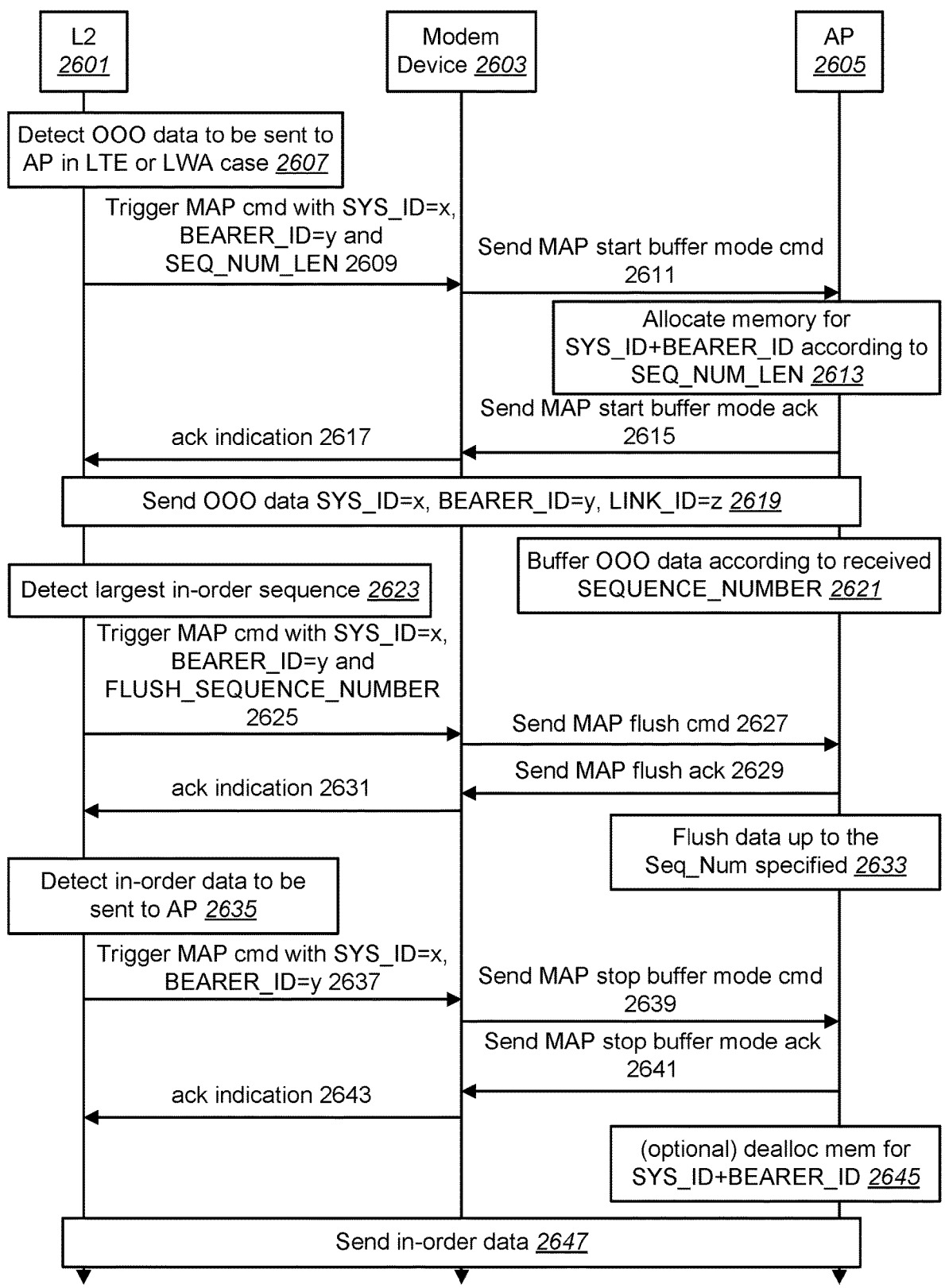
FIG. 26 is a thread diagram illustrating an example of out of order data delivery.

FIG. 26 is a thread diagram illustrating an example of out of order data delivery (e.g., OOO data delivery using a MAP). In particular, FIG. 26 illustrates examples of operations of and interactions between a layer 2 (L2) 2601 (e.g., a layer 2 function, block, module, and/or processor), a modem device 2603 (e.g., modem processor, etc.), and an application processor 2605 (AP). In some configurations, the L2 2601 may be an example of one or more of a PDCP function (e.g., LTE PCDP 764, 1864) and/or an RLC and/or MAC function (e.g., LTE RLC/MAC 766, 1866). In some configurations, the functions performed by the modem device 2603 may performed by a reorderer (e.g., reorderer 342, 742, 1842). In some configurations, the functions performed by the application processor 2605 may be performed by an application processor described herein (e.g., one or more of the application processors 314, 714, 1814 described in relation to one or more of FIGS. 3, 7, and 18). In some configurations, one or more of the procedures described in connection with FIG. 26 may be performed utilizing one or more of the formats, structures, commands, and/or messages described in connection with one or more of FIGS. 22-25.

The L2 2601 may detect 2607 OOO data to be sent to the AP 2605 in an LTE or LWA case. The L2 2601 may trigger 2609 a MAP command (with SYS_ID=x, BEARER_ID=y, and SEQ_NUM_LEN. The modem device 2603 may send 2611 a MAP start buffer mode command to the AP 2605.

The AP 2605 may allocate 2613 memory (e.g., buffering memory) for SYS_ID in combination with BEARER_ID according to SEQ_NUM_LEN. The AP 2605 may send 2615 a MAP start buffer mode acknowledgement 2615 to the modem device 2603. The modem device 2603 may send 2617 an acknowledgement indication to the L2 2601. The L2 2601 and/or modem device 2603 may send 2619 OOO data (with SYS_ID=x, BEARER_ID=y, and LINK_ID=z) to the AP 2605. The AP 2605 may buffer 2621 OOO data according to a received SEQUENCE_NUMBER.

The L2 2601 may detect 2623 a largest in-order sequence (e.g., a largest allowed in-order sequence, a size threshold, etc.) The L2 2601 may trigger 2625 a MAP command (with SYS_ID=x, BEARER_ID=y, and a FLUSH_SEQUENCE_NUMBER). The modem device 2603 may send 2627 a MAP flush command to the AP 2605. The AP 2605 may send 2629 a MAP flush acknowledgement to the modem device 2603. The modem device 2603 may send 2631 an acknowledgement indication to the L2 2601.

The L2 2601 may detect 2635 in-order data to be sent to the AP 2605. The L2 2601 may trigger 2637 a MAP command (with SYS_ID=x and BEARER_ID=y). The modem device 2603 may send 2639 a MAP stop buffer mode command to the AP 2605. The AP 2605 may send 2641 a MAP stop buffer mode acknowledgement to the modem device 2603.

The modem device 2603 may send 2643 an acknowledgment indication to the L2 2601. Optionally, the AP 2605 may deallocate 2645 memory (e.g., buffering memory) for SYS_ID in combination with BEARER_ID. The L2 2601, the modem device 2603, and/or the AP 2605 may send 2647 in-order data. For example, the AP 2605 may consume in-order data that was reordered by the L2 2601, modem device 2603, and/or AP 2605.

Figure 27:
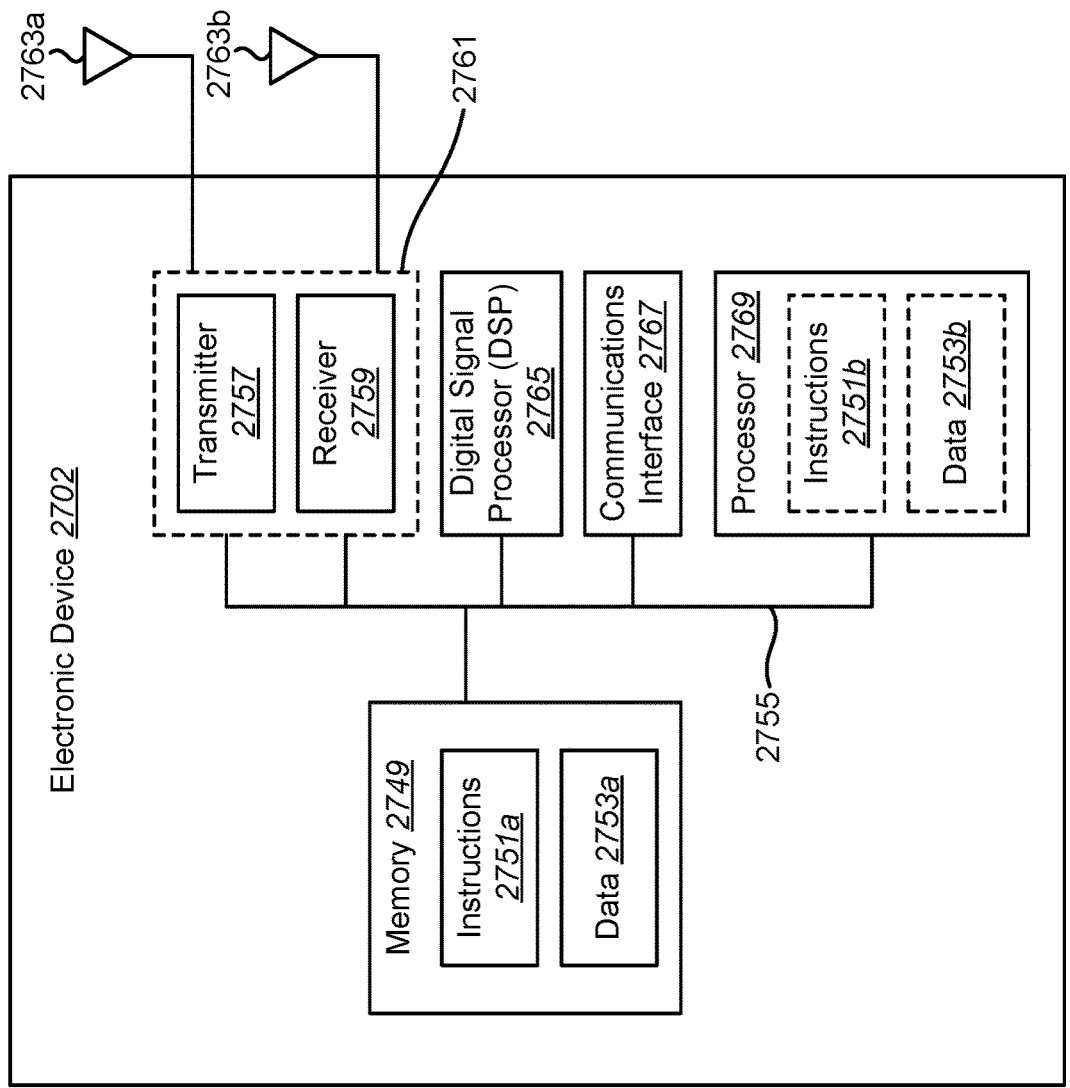
FIG. 27 illustrates certain components that may be included within an electronic device configured to implement various configurations of the systems and methods disclosed herein.

FIG. 27 illustrates certain components that may be included within an electronic device 2702 configured to implement various configurations of the systems and methods disclosed herein. The electronic device 2702 may be an access terminal, a mobile station, a user equipment (UE), a smartphone, a digital camera, a video camera, a tablet device, a laptop computer, a desktop computer, a server, etc. The electronic device 2702 may be implemented in accordance with one or more of the electronic devices 102, 202, 302 described herein.

The electronic device 2702 includes a processor 2769. The processor 2769 may be a general purpose single- or multi-chip microprocessor (e.g., an ARM), a special purpose microprocessor (e.g., a digital signal processor (DSP)), a microcontroller, a programmable gate array, etc. The processor 2769 may be referred to as a central processing unit (CPU). Although just a single processor 2769 is shown in the electronic device 2702, in an alternative configuration, a combination of processors (e.g., an ARM and DSP) could be implemented.

The electronic device 2702 also includes memory 2749. The memory 2749 may be any electronic component capable of storing electronic information. The memory 2749 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 2753a and instructions 2751a may be stored in the memory 2749. The instructions 2751a may be executable by the processor 2769 to implement one or more of the methods described herein. Executing the instructions 2751a may involve the use of the data 2753a that is stored in the memory 2749. When the processor 2769 executes the instructions 2751, various portions of the instructions 2751b may be loaded onto the processor 2769 and/or various pieces of data 2753b may be loaded onto the processor 2769. In some configurations, the instructions 2751 may be executable to implement and/or perform one or more of the methods 400, 500, 600, 1600, 1700, and/or one or more of the functions, procedures, and/or operations described herein.

The electronic device 2702 may also include a transmitter 2757 and a receiver 2759 to allow transmission and reception of signals to and from the electronic device 2702. The transmitter 2757 and receiver 2759 may be collectively referred to as a transceiver 2761. One or more antennas 2763a-b may be electrically coupled to the transceiver 2761. The electronic device 2702 may also include (not shown) multiple transmitters, multiple receivers, multiple transceivers and/or additional antennas.

The electronic device 2702 may include a digital signal processor (DSP) 2765. The electronic device 2702 may also include a communications interface 2767. The communications interface 2767 may allow and/or enable one or more kinds of input and/or output. For example, the communications interface 2767 may include one or more ports and/or communication devices for linking other devices to the electronic device 2702. In some configurations, the communications interface 2767 may include the transmitter 2757, the receiver 2759, or both (e.g., the transceiver 2761). Additionally or alternatively, the communications interface 2767 may include one or more other interfaces (e.g., touchscreen, keypad, keyboard, microphone, camera, etc.). For example, the communication interface 2767 may enable a user to interact with the electronic device 2702.

The various components of the electronic device 2702 may be coupled together by one or more buses, which may include a power bus, a control signal bus, a status signal bus, a data bus, etc. For the sake of clarity, the various buses are illustrated in FIG. 27 as a bus system 2755.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for reordering data by an electronic device, the method comprising:
    receiving, by a modem processor, a first set of data packets via a first radio access technology (RAT);
    receiving, by the modem processor, a second set of data packets via a second radio access technology (RAT), wherein the first set of data packets and the second set of data packets are from a data stream;
    providing, by the modem processor, at least a portion of the first set of data packets or at least a portion of the second set of data packets to an application processor;
    buffering, in application processor memory, the at least the portion of the first set of data packets or the at least the portion of the second set of data packets to offload modem memory while the modem processor determines an order of the at least the portion of the first set of data packets or the at least the portion of the second set of data packets;
    determining, by the modem processor, a first reordering information or a second reordering information based on sequence numbering of the portion of the first set of data packets or of the portion of the second set of data packets, wherein the first reordering information or the second reordering information comprises one or more completion events;
    providing, by the modem processor, the first reordering information for the at least the portion of the first set of data packets or the second reordering information for the at least the portion of the second set of data packets to the application processor, wherein the first reordering information or the second reordering information is sent in an order for packet consumption by the application processor; and
    reordering, by the application processor, the at least the portion of the first set of data packets or the at least the portion of the second set of data packets based on the first reordering information or the second reordering information provided by the modem processor.

2. The method of claim 1, wherein determining the first reordering information or the second reordering information comprises reordering an out of order event ring based on the sequence numbering.

3. The method of claim 1, wherein the at least the portion of the first set of data packets is a first aggregated set of packets in contiguous order or the at least the portion of the second set of data packets is a second aggregated set of packets in contiguous order.

4. The method of claim 3, further comprising determining the first reordering information or the second reordering information by determining a first sequence number and a last sequence number for the first aggregated set of packets or for the second aggregated set of packets.

5. The method of claim 1, wherein the at least the portion of the first set of data packets or the at least the portion of the second set of data packets are provided to an application processor for storage in a single frame regardless of whether the at least the portion of the first set of data packets or the at least the portion of the second set of data packets are in contiguous order, and wherein the method further comprises determining the first reordering information or the second reordering information by determining a length, an offset, and an end indicator for at least a contiguous portion of a first aggregated set of packets or for at least a contiguous portion of a second aggregated set of packets.

6. The method of claim 1, wherein the first reordering information or the second reordering information comprises a sequence indicator for each of the data packets of the at least the portion of the first set of data packets or the at least the portion of the second set of data packets, a bearer indicator for each of the data packets of the at least the portion of the first set of data packets or the at least the portion of the second set of data packets, and a link indicator for each of the data packets of the at least the portion of the first set of data packets or the at least the portion of the second set of data packets.

7. The method of claim 1, further comprising:
detecting, by the modem processor, a flushing condition; and providing, by the modem processor, a flush command to the application processor.

8. The method of claim 1, further comprising controlling, by the modem processor, reordering logic in the application processor in order to perform one or more of stopping, starting, and flushing out of order buffers in the application processor memory.

9. The method of claim 1, wherein the application processor is included in a host of the electronic device and the modem processor is included in a modem device of the electronic device.

10. An electronic device, comprising:
a modem processor configured to receive a first set of data packets via a first radio access technology (RAT), to receive a second set of data packets via a second radio access technology (RAT), wherein the first set of data packets and the second set of data packets are from a data stream, to provide at least a portion of the first set of data packets or at least a portion of the second set of data packets to an application processor, to determine a first reordering information or a second reordering information based on sequence numbering of the portion of the first set of data packets or of the portion of the second set of data packets, wherein the first reordering information or the second reordering information comprises one or more completion events, and to provide the first reordering information for the at least the portion of the first set of data packets or the second reordering information for the at least the portion of the second set of data packets to the application processor, wherein the first reordering information or the second reordering information is sent in an order for packet consumption by the application processor; and application processor memory configured to buffer the at least the portion of the first set of data packets or the at least the portion of the second set of data packets to offload modem memory while the modem processor determines an order of the at least the portion of the first set of data packets or the at least the portion of the second set of data packets, wherein the application processor is configured to reorder the at least the portion of the first set of data packets or the at least the portion of the second set of data packets based on the first reordering information or the second reordering information provided by the modem processor.

11. The electronic device of claim 10, wherein the modem processor is configured to determine the first reordering information or the second reordering information by reordering an out of order event ring based on the sequence numbering.

12. The electronic device of claim 10, wherein the at least the portion of the first set of data packets is a first aggregated set of packets in contiguous order or the at least the portion of the second set of data packets is a second aggregated set of packets in contiguous order.

13. The electronic device of claim 12, wherein the modem processor is configured to determine the first reordering information or the second reordering information by determining a first sequence number and a last sequence number for the first aggregated set of packets or for the second aggregated set of packets.

14. The electronic device of claim 10, wherein the modem processor is configured to provide the at least the portion of the first set of data packets or the at least the portion of the second set of data packets to the application processor for storage in a single frame regardless of whether the at least the portion of the first set of data packets or the at least the portion of the second set of data packets are in contiguous order, and wherein the modem device is configured to determine the first reordering information or the second reordering information by determining a length, an offset, and an end indicator for at least a contiguous portion of a first aggregated set of packets or for at least a contiguous portion of a second aggregated set of packets.

15. The electronic device of claim 10, wherein the first reordering information or the second reordering information comprises a sequence indicator for each of the data packets of the at least the portion of the first set of data packets or the at least the portion of the second set of data packets, a bearer indicator for each of the data packets of the at least the portion of the first set of data packets or the at least the portion of the second set of data packets, and a link indicator for each of the data packets of the at least the portion of the first set of data packets or the at least the portion of the second set of data packets.

16. The electronic device of claim 10, wherein the modem processor is configured to detect a flushing condition, and to provide a flush command to the application processor.

17. The electronic device of claim 10, wherein the modem processor is configured to control reordering logic in the application processor in order to perform one or more of stopping, starting, and flushing out of order buffers in the application processor memory.

18. A non-transitory tangible computer-readable medium storing computer executable code, comprising:
code for causing an electronic device to receive, by a modem processor, a first set of data packets via a first radio access technology (RAT);
code for causing the electronic device to receive, by the modem processor, a second set of data packets via a second radio access technology (RAT), wherein the first set of data packets and the second set of data packets are from a data stream;

code for causing the electronic device to provide, by the modem processor, at least a portion of the first set of data packets or at least a portion of the second set of data packets to an application processor;

code for causing the electronic device to buffer, in application processor memory, the at least the portion of the first set of data packets or the at least the portion of the second set of data packets to offload modem memory while the modem processor determines an order of the at least the portion of the first set of data packets or the at least the portion of the second set of data packets;

code for causing the electronic device to determine, by the modem processor, a first reordering information or a second reordering information based on sequence numbering of the portion of the first set of data packets or of the portion of the second set of data packets, wherein the first reordering information or the second reordering information comprises one or more completion events;

code for causing the electronic device to provide, by the modem processor, the first reordering information for the at least the portion of the first set of data packets or the second reordering information for the at least the portion of the second set of data packets to the application processor, wherein the first reordering information or the second reordering information is sent in an order for packet consumption by the application processor; and code for causing the electronic device to reorder, by the application processor, the at least the portion of the first set of data packets or the at least the portion of the second set of data packets based on the first reordering information or the second reordering information provided by the modem processor.

19. An apparatus, comprising:

modem processing means for receiving a first set of data packets via a first radio access technology (RAT), for receiving a second set of data packets via a second radio access technology (RAT), wherein the first set of data packets and the second set of data packets are from a data stream, for providing at least a portion of the first set of data packets or at least a portion of the second set of data packets to an application processing means, for determining a first reordering information or a second reordering information based on sequence numbering of the portion of the first set of data packets or of the portion of the second set of data packets, wherein the first reordering information or the second reordering information comprises one or more completion events, and for providing the first reordering information for the at least the portion of the first set of data packets or the second reordering information for the at least the portion of the second set of data packets to the application processor, wherein the first reordering information or the second reordering information is sent in an order for packet consumption by the application processor; and application processing memory means for buffering the at least the portion of the first set of data packets or the at least the portion of the second set of data packets to offload modem memory means while the modem processor means determines an order of the at least the portion of the first set of data packets or the at least the portion of the second set of data packets, wherein the application processing means reorders the at least the portion of the first set of data packets or the at least the portion of the second set of data packets based on the first reordering information or the second reordering information provided by the modem processing means.

* * * * *